(12) United States Patent
Yamauchi et al.

(10) Patent No.: US 7,583,875 B2
(45) Date of Patent: Sep. 1, 2009

(54) ILLUMINATION DEVICE, IMAGE DISPLAY DEVICE, AND PROJECTOR

(75) Inventors: Taisuke Yamauchi, Suwa (JP); Takashi Takeda, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 11/490,264

(22) Filed: Jul. 21, 2006

(65) Prior Publication Data

US 2007/0019909 A1    Jan. 25, 2007

(30) Foreign Application Priority Data

| Jul. 22, 2005 | (JP) | ............................ 2005-213493 |
| Jul. 22, 2005 | (JP) | ............................ 2005-213495 |
| Jul. 27, 2005 | (JP) | ............................ 2005-217148 |
| Sep. 30, 2005 | (JP) | ............................ 2005-286993 |

(51) Int. Cl.
    *G02B 6/34* (2006.01)
    *G02B 5/32* (2006.01)
(52) U.S. Cl. .......................................... 385/37; 359/15
(58) Field of Classification Search .................. None
    See application file for complete search history.

(56) References Cited

U.S. PATENT DOCUMENTS

| 6,141,124 | A | * | 10/2000 | Suzuki et al. .................. 359/15 |
| 6,369,375 | B1 | * | 4/2002 | Ishiwata ................... 250/208.1 |
| 6,606,173 | B2 | | 8/2003 | Kappel et al. |
| 6,799,849 | B2 | | 10/2004 | Kim et al. |
| 2004/0004586 | A1 | | 1/2004 | Endo et al. |

FOREIGN PATENT DOCUMENTS

| JP | 10-142711 | 5/1998 |
| JP | A 11-64789 | 3/1999 |
| JP | A 2000-162548 | 6/2000 |
| JP | 2001-013583 | 1/2001 |
| JP | 2002-099046 | 4/2002 |
| JP | 2002-202414 | 7/2002 |
| JP | 2003-195213 | 7/2003 |
| JP | 2003-270585 | 9/2003 |
| JP | A 2004-525390 | 8/2004 |
| JP | 2005-099816 | 4/2005 |
| WO | WO 02/10855 A2 | 2/2002 |

* cited by examiner

*Primary Examiner*—Tina M Wong
(74) *Attorney, Agent, or Firm*—Oliff & Berridge, PLC

(57) ABSTRACT

An image display device includes: a first face; a laser light source device emitting laser light; and a diffractive optical element on which the laser light emitted from the laser light source device is incident, generating diffracted light from the incident laser light, and illuminating the first face with the diffracted light, the first face is provided at a position on which zero-order light emitted from the diffractive optical element is not incident, and an image is displayed by light via the first face.

16 Claims, 28 Drawing Sheets

DIFFUSED ZERO-ORDER LIGHT

DIFFUSED ZERO-ORDER LIGHT

SUPPRESSED INTENSITY OF
THE ZERO-ORDER LIGHT

DIFFUSED ZERO-ORDER LIGHT

ILLUMINATION DEVICE, IMAGE DISPLAY DEVICE, AND PROJECTOR

CROSS-REFERENCE TO RELATED APPLICATION

This application claims priority on Japanese Patent Application No. 2005-217148, filed Jul. 27, 2005, Japanese Patent Application No. 2005-286993, filed Sep. 30, 2005, Japanese Patent Application No. 2005-213493, filed Jul. 22, 2005, and Japanese Patent Application No. 2005-213495, filed Jul. 22, 2005, the contents of which are incorporated herein by reference.

BACKGROUND

1. Technical Field

The present invention relates to an illumination device, an image display device, and a projector.

2. Related Art

Projection type image display devices (projectors) are conventionally known.

A projection type image display device uses a projection system to project colored light, which contains image information generated by a spatial light modulation device such as a liquid crystal device, onto a screen.

In a projection type image display device, as disclosed in Japanese Unexamined Patent Publication, First Publication No. H11-64789 and Japanese Unexamined Patent Publication, First Publication No. 2000-162548, a technique of using laser light as a light source is proposed.

In such a projection type image display device, an incidence face of the spatial light modulation device must be illuminated by laser light with uniform illuminance distribution.

When using a predetermined optical system to realize uniform illuminance distribution, there is concern that a desired image may not be obtained due to the positional relationship between the laser light and the optical system.

Furthermore, depending on the configuration of the optical system, there is concern that the device will become larger and more complex, or that its cost will increase.

Depending on the configuration of the optical system, there is also concern that the light utilization efficiency will decrease.

In order to obtain a desired image in a projection type image display device, it is important to illuminate the incidence face of the spatial light modulation device with laser light of uniform distribution.

Therefore, it is important to construct an optical system for illuminating the incidence face of the spatial light modulation device with laser light of uniform distribution.

SUMMARY

An advantage of some aspects of the invention is to provide an illumination device, an image display device, and a projector which can obtain a desired image, suppress increase in the size and complexity of the device or increase in device cost, and efficiently illuminate a predetermined face.

A first aspect of the invention provides an image display device, including: a first face; a laser light source device emitting laser light; and a diffractive optical element on which the laser light emitted from the laser light source device is incident, generating diffracted light from the incident laser light, and illuminating the first face with the diffracted light, and the first face is provided at a position on which zero-order light emitted from the diffractive optical element is not incident, and an image is displayed by light via the first face.

According to the invention, since the first face is provided at a position on which zero-order light emitted from the diffractive optical element is not incident upon it, even if the zero-order light is emitted by diffractive optical element, it is possible to prevent the zero-order light to be incident on the first face.

Therefore, a desired region of the first face can be illuminated, and a desired image can be obtained by the light illuminated on the first face.

It is preferable that, in the image display device of the first aspect of the invention, the first face be provided at a position separated from an extension line of the incident laser light which is incident on the diffractive optical element.

It is possible to prevent the zero-order light to be incident on the first face.

It is preferable that, in the image display device of the first aspect of the invention, the diffractive optical element illuminate the first face with primary light.

It is possible to illuminate the first face in a desired state.

It is preferable that, in the image display device of the first aspect of the invention, the diffractive optical element illuminate a predetermined illumination region on the first face by diffractive light.

Therefore, increase in the size and complexity of the device, or in the device cost, can be suppressed, and the first face can be illuminated efficiently.

It is preferable that, in the image display device of the first aspect of the invention, the diffractive optical element illuminate a rectangular illumination region on the first face.

Therefore, the illumination region can be illuminated efficiently.

It is preferable that the image display device of the first aspect of the invention further include: a plurality of the laser light source devices, each of which having a light-emitting face; and the first face having a predetermined side, and the light-emitting faces be aligned along the predetermined side in plan view.

Therefore, the first face can be illuminated efficiently with high illumination.

Furthermore, generation of a speckled pattern can be suppressed, and the first face can be illuminated with substantially uniform illumination distribution.

It is preferable that, in the image display device of the first aspect of the invention, the first face include a first side and a second side which is longer than the first side, and the light-emitting faces be aligned along the second side in plan view.

Therefore, generation of a speckled pattern can be suppressed, and the first face can be efficiently illuminated with high illumination and substantially uniform illumination distribution.

It is preferable that, in the image display device of the first aspect of the invention, the first face include two mutually opposing sides, and light-emitting faces be aligned along each of the two sides in plan view.

Therefore, generation of a speckled pattern can be suppressed, and the first face can be efficiently illuminated with high illumination and substantially uniform illumination distribution.

It is preferable that, in the image display device of the first aspect of the invention, the first face include at least two pairs of mutually opposing sides, and light-emitting faces be aligned along each of the sides in plan view.

Therefore, generation of a speckled pattern can be suppressed, and the first face can be efficiently illuminated with high illumination and substantially uniform illumination distribution.

It is preferable that, in the image display device of the first aspect of the invention, the first face contain image information.

It is possible to display an image using the light which illuminates the first face.

It is preferable that, in the image display device of the first aspect of the invention, the diffractive optical element emit the zero-order light in a direction which is different to the incidence direction of the laser light incident on the diffractive optical element, and the first face be provided on an extension line of the laser light which is incident upon the diffractive optical element.

According to the invention, even if the diffractive optical element emits zero-order light, it is possible to prevent the zero-order light to be incident on the first face. In addition, it is possible to make the device be more compact.

It is preferable that the image display device of the first aspect of the invention further include: a spatial light modulation device having an incidence face and modulating light illuminated on the first face in accordance with an image signal, and the first face include the incidence face of the spatial light modulation device.

It is preferable that the spatial light modulation device include a liquid crystal device. It is possible to display a desired image.

A second aspect of the invention provides a projector, including: the above described image display device; and a projection system projecting light containing image information via the first face on a second face.

According to the invention, increases in the size and complexity of the device, or increase in its cost, can be suppressed, and a desired image can be formed.

A third aspect of the invention provides an illumination device, including: a first face including a predetermined illumination region; a laser light source device emitting laser light; and a diffractive optical element on which the laser light emitted from the laser light source device is incident, generating diffracted light from the incident laser light, and illuminating on the predetermined illumination region of the first face with the diffracted light.

According to the invention, increases in the size and complexity of the device, or increase in its cost, can be suppressed, and the first face can be efficiently illuminated with high illumination.

It is preferable that, in the illumination device of the third aspect of the invention, the diffractive optical element illuminate on a rectangular illumination region of the first face. It is possible to illuminate the illumination region efficiently.

It is preferable that, in the illumination device of the third aspect of the invention, the diffractive optical element uniformize the illumination in the illumination region.

It is possible to illuminate the illumination region in a desired state.

It is preferable that, in the illumination device of the third aspect of the invention, the diffractive optical element have a light-emitting face including an emission region from which light is emitted, and illuminate on the illumination region which is larger than the emission region.

Therefore, an enlarged illumination region is illuminated on the first face.

It is preferable that, in the illumination device of the third aspect of the invention, the laser light emitted from the laser light source device be made directly incident on the diffractive optical element.

Therefore, the number of components of the illumination device can be reduced, and the light utilization efficiency can be increased.

It is preferable that the illumination device of the third aspect of the invention further include: a plurality of the laser light source devices and a plurality of the diffractive optical elements, and each of the diffractive optical elements be arranged in correspondence with each of the laser light source devices.

It is possible to efficiently illuminate the first face with high illumination.

Furthermore, generation of a speckled pattern can be suppressed, and the first face can be efficiently illuminated with substantially uniform illumination distribution.

It is preferable that, in the illumination device of the third aspect of the invention, a predetermined region on the first face is overlappingly illuminated by the diffracted lights generated by the plurality of diffractive optical elements.

It is possible to efficiently illuminate the first face with high illumination.

Furthermore, generation of a speckled pattern can be suppressed, and the first face can be efficiently illuminated with substantially uniform illumination distribution.

It is preferable that, in the illumination device of the third aspect of the invention, the laser light source devices are arranged in an array.

It is possible to efficiently illuminate the first face with high illumination.

Furthermore, generation of a speckled pattern can be suppressed, and the first face can be efficiently illuminated with substantially uniform illumination distribution.

It is preferable that the illumination device of the third aspect of the invention, further include: an angle adjusting optical element provided between the diffractive optical element and the first face, on which light from the diffractive optical element is illuminated, adjusting an emission angle of the light, and emitting the light.

Therefore, the incidence angle of light to the first face can be adjusted, and the first face can be efficiently illuminated.

It is preferable that, in the illumination device of the third aspect of the invention, the angle adjusting optical element include a refractive lens, and the angle adjusting optical element include a diffractive optical element.

It is preferable that the illumination device of the third aspect of the invention, further include: a light-transmitting substrate including a first substrate face and a second substrate face, and the diffractive optical element be provided on the first substrate face and the angle adjusting optical element be provided on the second substrate face.

Therefore, the number of components of the illumination device can be reduced, and the first face can be efficiently illuminated.

It is preferable that, in the illumination device of the third aspect of the invention, the first face contains image information.

It is possible to display an image using the light which illuminates the first face.

A fourth aspect of the invention provides an image display device, including: a first face illuminated by the above described illumination device, and the image display device displays an image by light via the first face.

According to the invention, increases in the size and complexity of the device, or increase in its cost, can be suppressed, and a superior image can be formed with high luminance.

It is preferable that the image display device of the fourth aspect of the invention further include: a spatial light modulation device having an incidence face and modulating light illuminated on the first face in accordance with an image signal, and the first face include the incidence face of the spatial light modulation device.

It is preferable that the spatial light modulation device include a liquid crystal device. It is possible to display a desired image.

A fifth aspect of the invention provides a projector, including: the above described image display device; and a projection system projecting light containing image information via the first face on a second face.

According to the invention, increases in the size and complexity of the device, or increase in its cost, can be suppressed, and a superior image can be formed with high luminance.

A sixth aspect of the invention provides an illumination device, including: a first face; a laser light source device emitting laser light; a diffusive optical element on which the laser light emitted from the laser light source device is incident, and diffusing the incident laser light thereby generating diffused light; and a diffractive optical element generating diffracted light from the diffused light generated by the diffusive optical element, and illuminating the first face with the diffracted light.

According to the invention, since the first face is illuminated with diffracted light generated from diffused light, even if the diffractive optical element emits zero-order light, a local increase in the illumination (luminance) of this zero-order light on the first face can be prevented.

Therefore, the first face can be illuminated in a desired state.

It is preferable that, in the illumination device of the sixth aspect of the invention, the diffractive optical element illuminate on a rectangular illumination region of the first face. It is possible to illuminate the illumination region efficiently.

It is preferable that, in the illumination device of the sixth aspect of the invention, the diffusive optical element include a scattering member scattering light illuminated to the diffusive optical element.

It is preferable that, in the illumination device, the scattering member include a light-transmitting substrate and microparticles on the substrate, or an optical element having a rough face.

It is preferable that, in the illumination device of the sixth aspect of the invention, the diffusive optical element include the diffractive optical element.

It is preferable that the illumination device of the sixth aspect of the invention further include: an angle adjusting optical element provided between the diffractive optical element and the first face, on which light from the diffractive optical element is illuminated, adjusting an emission angle of the light, and emitting the light.

It is possible to adjust the incidence angle of light to the first face, and efficiently illuminate the first face.

It is preferable that, in the illumination device of the sixth aspect of the invention, the angle adjusting optical element include a refractive lens or a diffractive optical element.

It is preferable that the illumination device of the sixth aspect of the invention further include: a light-transmitting substrate including a first substrate face and a second substrate face, and the diffusive optical element be provided on the first substrate face and the diffractive optical element be provided on the second substrate face.

Therefore, the number of components of the illumination device can be reduced, and the first face can be efficiently illuminated.

It is preferable that the illumination device of the sixth aspect of the invention further include: a plurality of the laser light source devices arranged in an array.

It is possible to efficiently illuminate the first face with high illumination.

Furthermore, generation of a speckled pattern can be suppressed, and the first face can be illuminated with substantially uniform illumination distribution.

It is preferable that, in the illumination device of the sixth aspect of the invention, the first face contain image information.

It is possible to display an image using the light which illuminates the first face.

A seventh aspect of the invention provides an image display device, including: a first face illuminated by the above described illumination device, and the image display device displays an image by light via the first face.

According to the image display device of the invention, the image display is provided, which displays an image using light from the first face which is illuminated by the above-mentioned illumination device.

According to the invention, a desired image can be obtained using light via the first face, which is illuminated in a desired state.

It is preferable that the image display device of the seventh aspect of the invention further include: a spatial light modulation device having an incidence face and modulating light illuminated on the first face in accordance with an image signal, and the first face include the incidence face of the spatial light modulation device.

It is preferable that the spatial light modulation device include a liquid crystal device. It is possible to display a desired image.

An eighth aspect of the invention provides a projector, including: the above described image display device; and a projection system projecting light containing image information via the first face on a second face.

According to the invention, increases in the size and complexity of the device, or increase in its cost, can be suppressed, and a desired image can be formed well.

DESCRIPTION OF EXEMPLARY EMBODIMENTS

Embodiments of the invention will be explained with reference to the drawings.

In the following explanation, positional relationships between respective members are described while referring to an XYZ linear coordinate system.

First Embodiment

Figure 1:
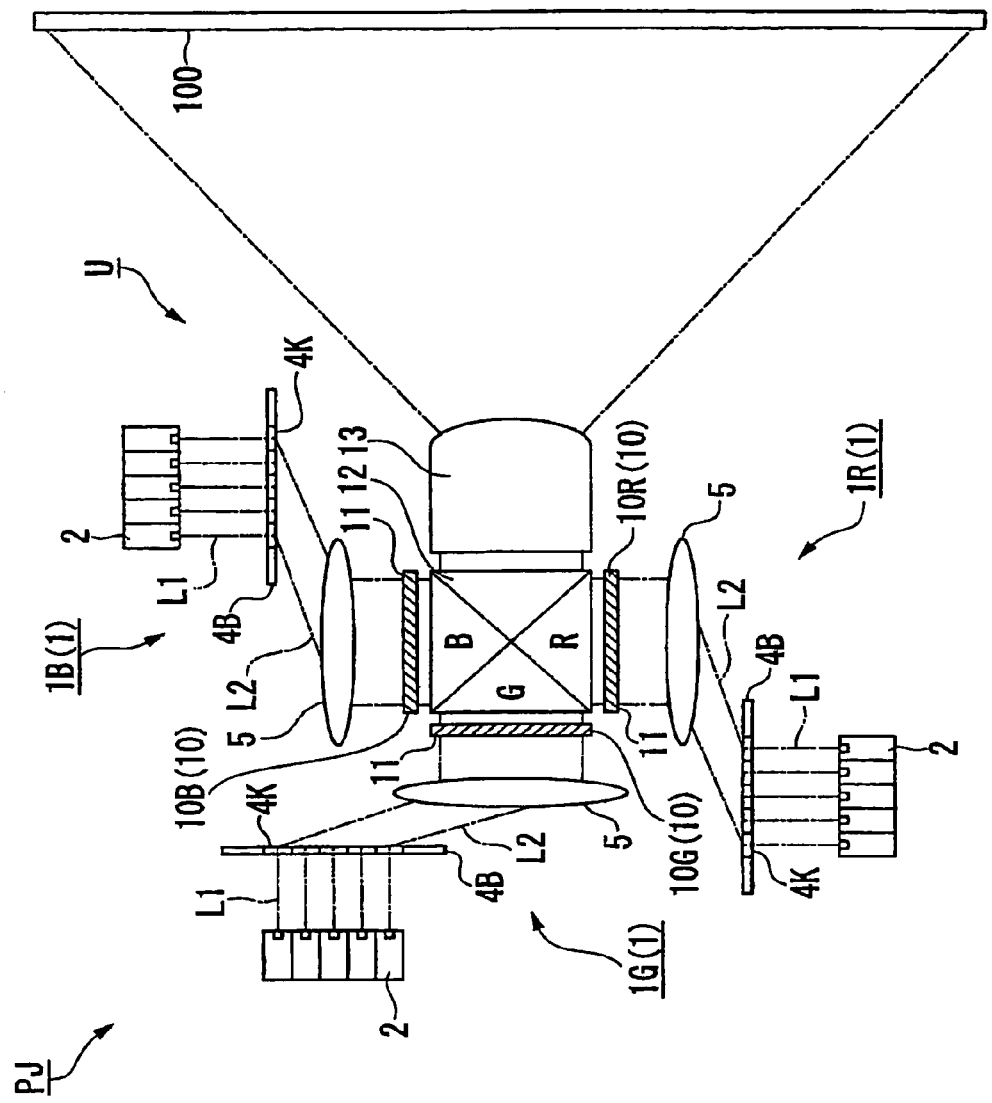
FIG. 1 is a schematic diagram of an image display device according to a first embodiment.
Figure 2:
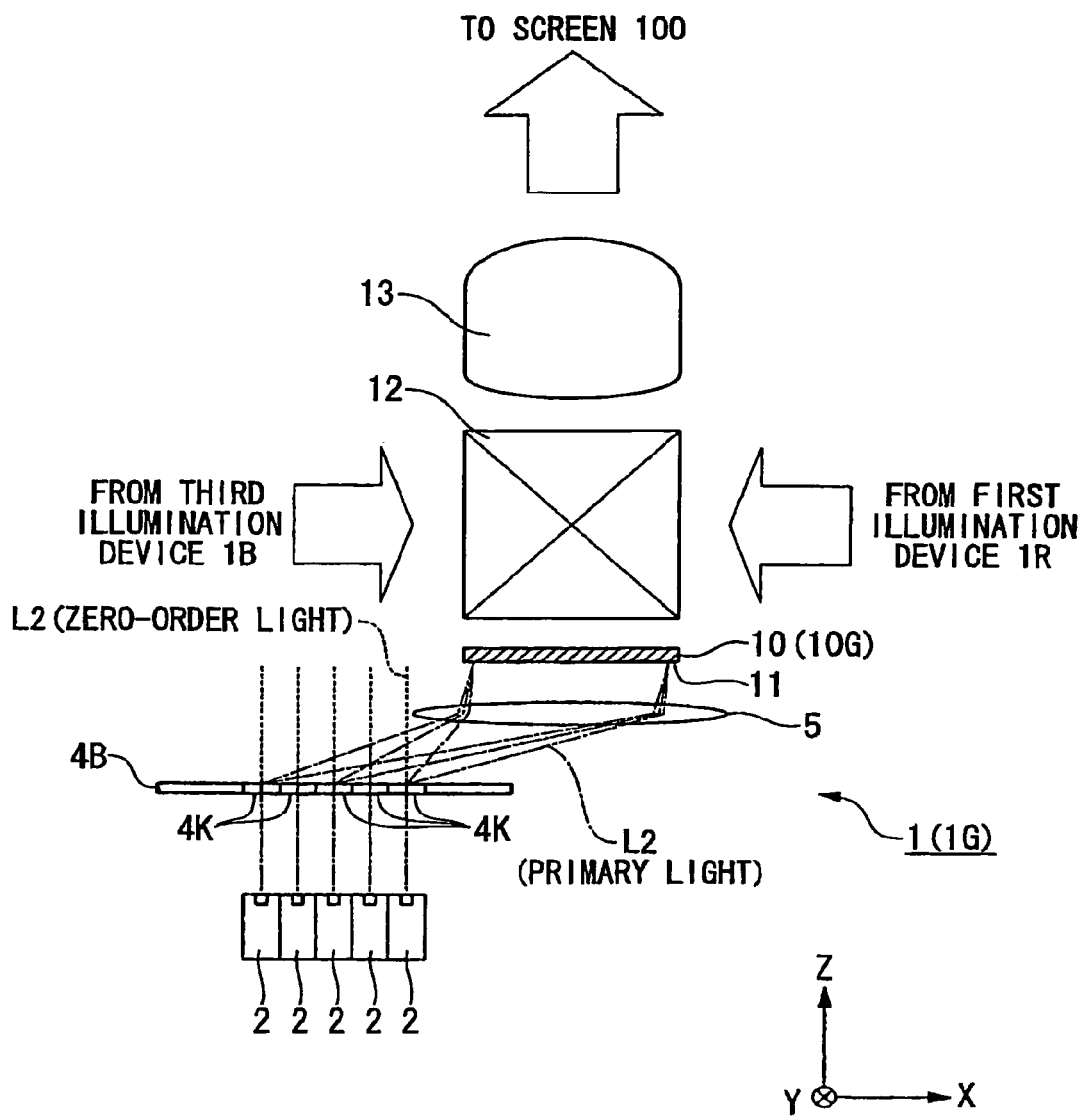
FIG. 2 is a schematic diagram of primary parts of FIG. 1.

A first embodiment will be explained. FIG. 1 is a schematic diagram of an image display device PJ according to a first embodiment, and FIG. 2 is an enlarged view of primary parts of FIG. 1.

In this embodiment, as an example of an image display device, a projection type image display device (projector) is described. This projection type image display device projects colored light containing image information generated by a spatial light modulation device via a projection system on a screen.

In FIG. 1, the projector PJ includes a projection unit U which projects light containing image information on a screen 100 (second face).

By projecting the light from the projection unit U on the screen 100, an image is formed on the screen 100.

The projector PJ of this embodiment uses a transmission type screen as the screen 100, and projects the light containing image information on the screen 100 from a front face side thereof.

The projection unit U includes a first illumination device 1R which can illuminate a first face with light of a first basic color (red light), a second illumination device 1G which can illuminate the first face with light of a second basic color (green light), a third illumination device 1B which can illuminate the first face with light of a third basic color light (blue light), a first spatial light modulation device 10R which has an incidence face (first face) 11 illuminated by the first illumination device 1R, and modulates illuminated light in accordance with the image information, a second spatial light modulation device 10G which has an incidence face (first face) 11 illuminated by the second illumination device 1G, and modulates illuminated light in accordance with the image information, a third spatial light modulation device 10B which has an incidence face (first face) 11 illuminated by the third illumination device 1B, and modulates illuminated light in accordance with the image information, a color synthesis system 12 which synthesizes the basic color lighted lights modulated by the spatial light modulation devices 10R, 10G, and 10B, and a projection system 13 which projects the light generated by the color synthesis system 12 on the screen 100.

Each of the spatial light modulation devices 10R, 10G, and 10B contains a liquid crystal device.

For convenience in the following explanation, "spatial light modulation device" is termed "light valve".

A light valve includes an incidence side polarization plate, a panel including a liquid crystal sealed between a pair of glass substrates, and an emission side polarizing plate. Pixel electrodes and orientation films are provided on the glass substrates.

The light valves constituting the spatial light modulation devices allow transmission only of light in predetermined oscillation directions, and the lights of basic colors incident on the light valves are modulated as they pass through them.

Each of the illumination devices 1 (1R, 1G, and 1B) includes a plurality of laser light source devices 2 which emit laser light L1, a diffractive optical element 4K on which the laser light L1 emitted from the laser light source devices 2 is incident, and which generates diffracted light from the laser light L1 and illuminates the incidence face 11 with this diffracted light L2, and an optical element 5 which is arranged between the incidence face 11 and the diffractive optical element 4K, and adjusts the incidence angle of the light which is incident on the incidence face 11.

The laser light source devices 2 of the first illumination device 1R emit red (R) laser light.

The first illumination device 1R uses the diffractive optical element 4K to generate, from the red laser light, diffracted light (diffused light) which illuminates a desired region, and illuminates the incidence face 11 of the first light valve 10R with this generated diffracted light via the optical element 5.

The laser light source devices 2 of the second illumination device 1G emit green (G) laser light.

The second illumination device 1G uses the diffractive optical element 4K to generate, from the green laser light, diffracted light (diffused light) which illuminates a desired region, and illuminates the incidence face 11 of the second light valve 10G with this generated diffracted light via the optical element 5.

The laser light source devices 2 of the third illumination device 1B emit blue (B) laser light.

The third illumination device 1B uses the diffractive optical element 4K to generate, from the blue laser light, diffracted light (diffused light) which illuminates a desired region, and illuminates the incidence face 11 of the third light valve 10B with this generated diffracted light via the optical element 5.

The lights of basic colors which are modulated by passing through the light valves 10R, 10G, and 10B (modulated lights) are synthesized by the color synthesis system 12.

The color synthesis system 12 includes a dichroic prism, and synthesizes the red light (R), the green light (G), and the blue light (B) into full-color synthesized light.

The full-color synthesized light emitted from the color synthesis system 12 is supplied to the projection system 13.

The projection system 13 projects the full-color synthesized light on the screen 100.

The projection system 13 is a so-called enlargement system which enlarges the image on the incidence side and projects it on the screen 100.

The projection unit U uses the projection system 13 to project the full-color synthesized light, which contains image information transmitted via the light valves 10R, 10G, and 10B respectively illuminated by the illumination devices 1R, 1G, and 1B, on the screen 100, and thereby forms a full-color image on the screen 100.

An observer views the image emitted on the screen 100 via the projection unit U.

Subsequently, an illumination device 10 which illuminates the incidence face 11 of a spatial light modulation device 10 will be explained while referring to FIG. 2.

While the following explanation describes the second illumination device 1G which illuminates the incidence face 11 of the second spatial light modulation device 10G, the illumination devices 1R and 1B which illuminate the other spatial light modulation devices 10R and 10B have substantially identical configurations.

In FIG. 2, the illumination device 1 (1G) illuminates the incidence face 11 of the spatial light modulation device 10, and includes: a plurality of laser light source devices 2 which emit laser light L1; a diffractive optical element 4K on which the laser light L1 emitted from the laser light source device 2 is incident, generating diffracted light L2 from the incident laser light L1, and illuminating the diffracted light L2 on the incidence face 11.

The plurality of laser light source devices 2 are arranged in an array. Iin this embodiment laser light source devices 2 are aligned in a one-dimensional direction (X-axis direction).

In FIG. 2, light-emitting faces of the laser light source devices 2 face a +Z side, such that the laser light source devices 2 emit light toward the +Z direction.

A plurality of the diffractive optical elements 4K are provided in correspondence with the plurality of laser light source devices 2.

The diffractive optical elements 4K are supported by a supporting member 4B.

In the example of FIG. 2, a plurality of the diffractive optical elements 4K are aligned on the supporting member 4B in a one-dimensional direction (X-axis direction) in correspondence with the plurality of laser light source devices 2.

The plurality of diffractive optical elements 4K are optimized in accordance with the positions, characteristics, and the like of the plurality of laser light source devices 2.

The incidence face 11 of the spatial light modulation device 10 is arranged at a position separated from an extension line of the laser light which is incident on the diffractive optical elements 4K.

Specifically, the incidence face 11 is provided at a position on which zero-order light emitted from the diffractive optical elements 4K is not incident.

The diffractive optical elements 4K generate primary light which illuminates the incidence face 11.

The optical element 5 (angle adjusting optical element) is provided between the diffractive optical element 4K and the incidence face 11.

The optical element 5 is illuminated by the primary light from the diffractive optical element 4K, and has an angle adjustment function of adjusting the emission angle of emitted light.

The optical element 5 includes a refractive lens (field lens).

The refractive lens includes, for example, a spherical face lens, or an axis objective lens which has rotational symmetry with regard to the optical axis of a non-spherical face lens or the like.

Alternatively, the optical element 5 may include a Fresnel lens or the like.

The optical element 5 can adjust the emission angle of light illuminated from each of the diffractive optical elements 4K, thereby adjusting the incidence angle of the light with respect to the incidence face 11.

In this embodiment, the optical element 5 is optimized to enable adjustment of the emission angle of light which it emits, such that the diffracted lights (primary lights) L2 from the plurality of diffractive optical elements 4K overlappingly illuminate a predetermined region on the incidence face 11.

The diffractive optical elements 4K generate the diffracted light L2 using the laser light L1 emitted from the laser light source devices 2, and illuminate a predetermined illumination region of the incidence face 11 using the diffracted light L2.

The diffracted light L2 generated by the diffractive optical elements 4K is diffused such as to illuminate the predetermined region. The diffractive optical elements 4K illuminates the predetermined region of the incidence face 11 with the diffused light (diffracted light) L2, and uniformizes the illumination in the illumination region.

The illumination region of the incidence face 11 illuminated by each diffractive optical element 4K is larger than an emission region from which light from a light-emitting face of the diffractive optical element 4K is emitted.

Thus, the diffractive optical element 4K is a so-called enlargement system (enlargement illumination system).

Furthermore, in this embodiment, the diffractive optical element 4K illuminates a rectangular illumination region on the first face.

Figure 3B:
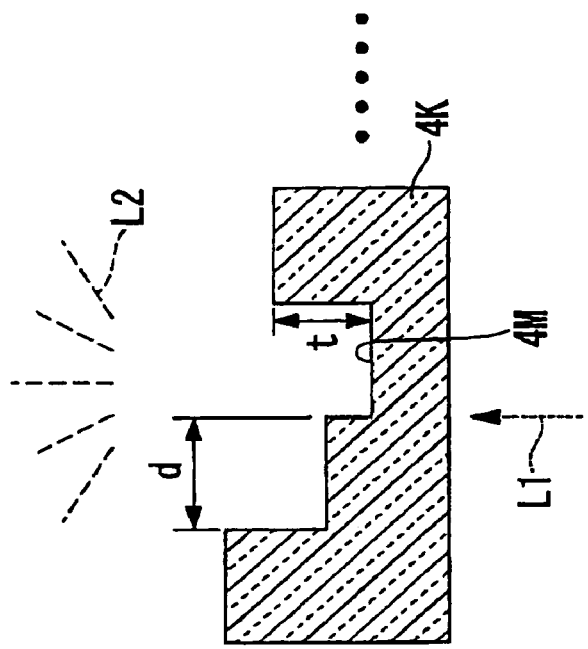
FIGS. 3A and 3B are schematic diagrams of an example of a diffusive optical element.
Figure 3A:
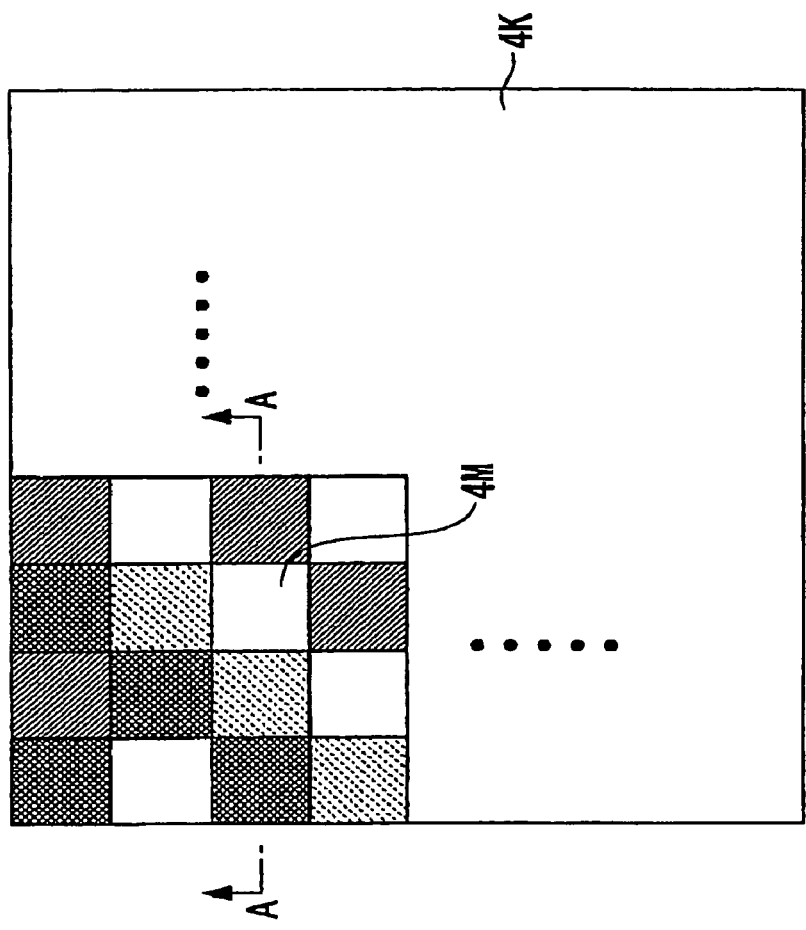

FIGS. 3A and 3B are schematic views of an example of a diffractive optical element 4K, in particular, FIG. 3A is a plan view, and FIG. 3B is a cross-sectional view taken along the line A-A of FIG. 3A.

The diffractive optical element shown in FIGS. 3A and 3B includes a plurality of rectangular reentrant portions 4M (uneven structure) in its surface.

The reentrant portions 4M have mutually different depths.

A plurality of salient portions between the reentrant portions 4M, have mutually different heights.

By appropriately adjusting surface conditions of the diffractive optical element 4K, including the pitch "d" between the reentrant portions 4M (the width of the indented and salient portions) and the depth "t" of the reentrant portions 4M (the height of the salient portions), light emitted by the diffractive optical element 4K can be diffused, and the size and shape of the illumination region can be determined.

In other words, desired functions can be imparted to the diffractive optical element 4K by optimizing surface conditions including the pitch "d" between the reentrant portions 4M and the depth "t" of the reentrant portions 4M.

In the case in which values for the pitches "d" between the reentrant portions 4M and the depths "t" of the reentrant portions 4M are made different for each of the plurality of regions on the surface of the diffractive optical element 4K, the surface conditions of the reentrant portions 4M also include the distribution of the pitches "d" between the reentrant portions 4M which are formed and the distribution of the depths "t" of the reentrant portions 4M.

An example of a setting method of optimizing the surface conditions, including the pitch "d" between the reentrant portions 4M and the depth "t" of the reentrant portions 4M, is a predetermined computation method (simulation method) such as repetitive Fourier.

By optimizing the surface conditions of the diffractive optical element 4K, it is possible to form the diffractive optical element 4K with desired functions.

The diffractive optical element 4K is not limited to one with rectangular reentrant portions 4M, and a diffractive grating with a surface which combines planes facing in mutually different directions is also acceptable.

Figure 4:
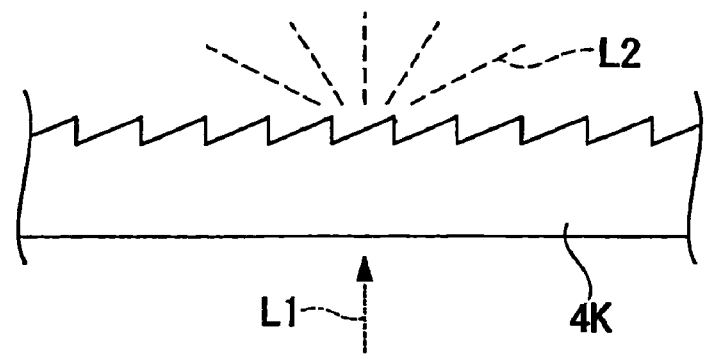
FIG. 4 is a schematic diagram of an example of a diffusive optical element.

For example, as shown in FIG. 4, the diffractive optical element 4K may include triangular reentrant portions with sloping faces.

The diffractive optical element 4K may include a region of rectangular reentrant portions such as that shown in FIGS. 3A and 3B, and also a region of triangular reentrant portions such as that shown in FIG. 4.

The diffractive optical element 4K can be formed with desired functions by optimizing its surface conditions.

Figure 5:
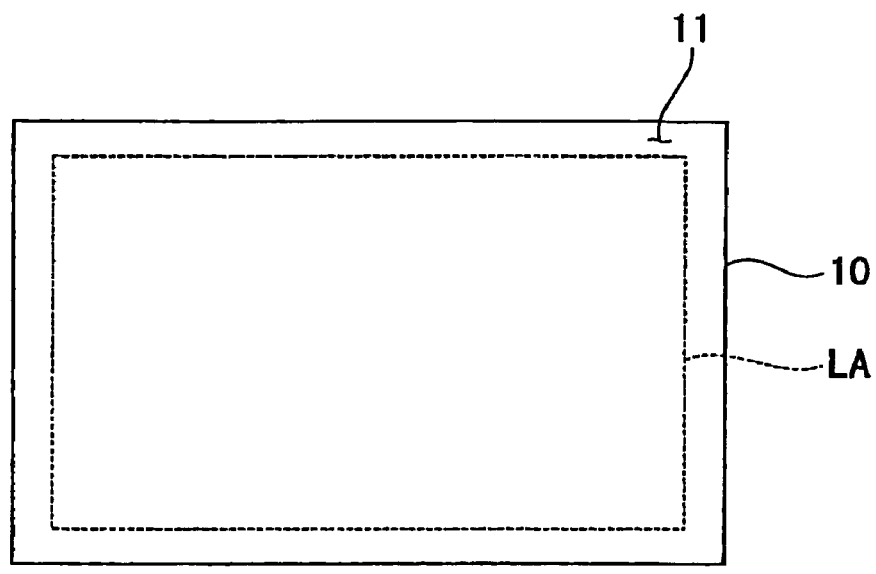
FIG. 5 is a diagram of a first face illuminated by an illumination device.

FIG. 5 is a schematic view of the incidence face 11 which is illuminated by the illumination devices 1 including the diffractive optical element 4K.

As shown in FIG. 5, the illumination device 1 including the diffractive optical element 4K can set an illumination region LA on the incidence face 11.

Specifically, the illumination device 1 including the diffractive optical element 4K can set at least one of the size and the shape of the illumination region LA on the incidence face 11.

In this embodiment, the illumination device 1 including the diffractive optical element 4K sets the illumination region LA to a rectangular shape (elongated shape).

The incidence face 11 of this embodiment has a rectangular shape (elongated shape), and the illumination device 1 including the diffractive optical element 4K sets the illumination region LA in accordance with the incidence face 11.

The size and shape of the illumination region LA can be set by appropriately adjusting the surface conditions of the diffractive optical element 4K (the pitch "d" between the reentrant portions 4M, the depth "t" of the reentrant portions 4M, etc.).

In other words, by optimizing the surface conditions including the pitch "d" between the reentrant portions 4M and the depth "t" of the reentrant portions 4M, the diffractive optical element 4K can be made to function as an illumination region setting optical system.

In addition, by optimizing the surface conditions of the diffractive optical element 4K, it is possible to generate diffracted light such that the illumination in the illumination region LA is made uniform, and the incidence face 11 can be illuminated in the illumination region LA which is larger than the emission region of the light-emitting face of the diffractive optical element 4K from which the light is emitted.

By using a predetermined method such as the abovementioned repetitive Fourier method to optimize the surface conditions of the diffractive optical element 4K, it is possible to obtain the diffractive optical element 4K having desired functions (illumination region setting function, diffused light generating function, enlarged illumination function, etc.).

Thus, the diffractive optical element 4K of this embodiment has an illumination region setting function, a diffused light generating function, and an enlarged illumination function. The surface conditions of the diffractive optical element 4K including the pitch "d" between the reentrant portions 4M and the depth "t" of the reentrant portions 4M are optimized such that the diffractive optical element 4K has these functions.

While in this embodiment, the diffractive optical element 4K sets the illumination region LA to a rectangular shape, the illumination region LA can be set to any given shape, such as a ring or a circle, by optimizing the surface conditions including the pitch "d" between the reentrant portions 4M and the depth "t" of the reentrant portions 4M.

An example of a method of manufacturing the diffractive optical element 4K will be explained while referring to FIGS. 6A to 6D.

Figure 6A:
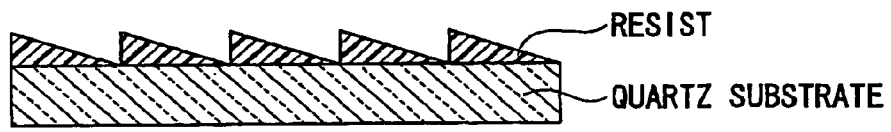
FIGS. 6A to 6D are schematic diagrams for explanation of an example of a manufacturing method for a diffractive optical element.

As shown in FIG. 6A, after applying a resist over a quartz substrate, the resist is illuminated with an electron beam from an electron beam printer, and patterned.

Figure 6B:

An etching process is performed to form a quartz mold as shown in FIG. 6B.

The mold and a substrate for forming a diffractive optical element, such as a film-like member of synthetic resin or the like, are then heated to a temperature equal to or greater than the glass transition temperature of the substrate.

Figure 6C:
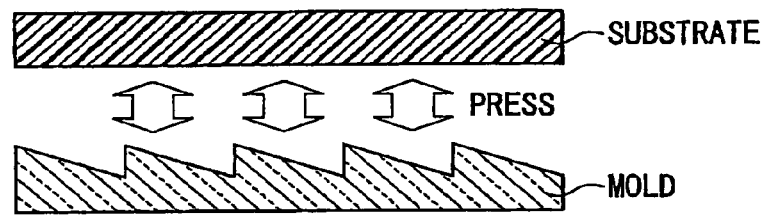

As shown in FIG. 6C, the substrate and the mold are pressed together and held for a fixed period of time.

Thereafter, the substrate and the mold are cooled to a temperature equal to or lower than the glass transition temperature of the substrate, and they are separated from each other.

Figure 6D:
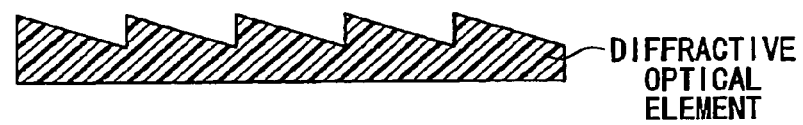

As shown in FIG. 6D, a diffractive optical element of synthetic resin having a desired shape is formed.

Thus, in this embodiment, after forming the mold, the shape of the mold is thermally transferred to the substrate, and the diffractive optical element is formed by a so-called nanoimprint method.

The manufacturing method of the diffractive optical element described here is merely an example, and it is possible to use any method which can manufacture a diffractive optical element having the desired shape.

As described above according to the image display device (projector) PJ of this embodiment, since the incidence face 11 is provided at a position separated from the extension line of the laser light L1 which is incident on the diffractive optical element 4K from the laser light source device 2, even if zero-order light is emitted from the diffractive optical element 4K, it is possible to prevent this zero-order light to be incident on the incidence face 11.

In this embodiment, the diffractive optical element 4K is set using a predetermined method such as the abovementioned repetitive Fourier method such that it does not emit zero-order light and such that the generated primary light can illuminate the incidence face 11 of the spatial light modulation device 10 with uniform illumination distribution.

However, there is concern that the diffractive optical element 4K will emit zero-order light due to manufacturing errors (process errors) at the time its manufacture, wavelength errors of the laser light L1 emitted from the laser light source devices 2, and the like.

Error (blurring) in the wavelength of the laser light L1 emitted from the laser light source device 2 may for example be caused by changes in temperature.

Zero-order light is often formed on the extension line of the laser light L1 which is incident on the diffractive optical element 4K.

Thus, in FIG. 2, zero-order light is often emitted in the normal direction (Z-axial direction) of the light-emitting face of the diffractive optical element 4K.

In such a case, when the incidence face 11 of the spatial light modulation device 10 is arranged on the extension line of the laser light L1 incident on the diffractive optical element 4K, there is concern that the incidence face 11 of the spatial light modulation device 10 will be illuminated by zero-order light.

When the incidence face 11 of the spatial light modulation device 10 is illuminated by zero-order light, the illumination (luminance) of the portion of the incidence face 11 illuminated by the laser light L1 may increase locally.

In that case, an image formed based on the spatial light modulation device 10 will be inferior.

In this embodiment, since the incidence face 11 is provided at a position separated from the extension line of the laser light L1 which is incident on the diffractive optical elements 4K from the laser light source devices 2, even if zero-order light is emitted from the diffractive optical elements 4K, it is possible to prevent the zero-order light to be incident on the incidence face 11.

Therefore, the desired image can be formed.

Furthermore according to the illumination device 1 of this embodiment, increase in the size and complexity of the device, or increase in its cost, can be suppressed, and the incidence face 11 can be illuminated efficiently with uniform illumination distribution.

Thus, when an optical system such as a rod integrator and a fly-eye lens is used to illuminate the incidence face 11 with uniform illumination distribution using laser lights emitted from the laser light source devices, the number of components and complexity of the optical system are liable to increase, there is concern that the size and complexity of the overall device may also increase.

There is also concern that increasing the number of components and using expensive components such as a rod integrator will increase the cost of the device.

Moreover, there is concern that Fresnel reflection loss and the like generated from the interfaces between the optical elements, and of a reduction in the light utilization efficiency and the like are occurred.

In this embodiment, since comparatively inexpensive optical elements are used and the number of components is suppressed, it is possible to suppress increases in the size and complexity of the device, or increase in the device cost, and efficiently illuminate the incidence face 11.

Furthermore, since the diffractive optical element 4K can set the illumination region LA on the incidence face 11, the illumination region LA can be efficiently illuminated.

Thus, when the incidence face 11 is illuminated by light via a lens or the like, there is concern that the shape of the illumination region LA may differ from the shape of the incidence face 11.

For example, while the incidence face 11 is rectangular, illumination via the lens may obtain a circular illumination region LA.

In this case, in order to illuminate the incidence face 11 while suppressing leakage of light, the circular illumination region LA must be enlarged and shaped using a light-intercepting member or the like. This reduces the light utilization efficiency.

In this embodiment, by using the diffractive optical element 4K to set the illumination region LA, almost all of the light generated by the diffractive optical element 4K can be illuminated on the incidence face 11, and it is possible to increase the light utilization efficiency.

Furthermore, since a laser light source device is used as the light source, polarized light can be emitted, and, in comparison with a configuration using a white-light source such as an ultrahigh frequency mercury lamp as the light source, components such a polarization dividing element (polarization beam splitter) and a color dividing element (dichroic mirror) can be omitted.

Since laser lights (lights of basic colors) of a narrow wavelength band are emitted, superior color reproduction can be obtained when displaying an image using these laser lights.

Furthermore, since ultraviolet light is not irradiated to the liquid crystal devices (light valves), deterioration of the light valves can be suppressed.

Furthermore in this embodiment, since the illumination device 1 includes a plurality of the laser light source devices 2, the amount of light (illumination) on the incidence face 11 can be increased.

By displaying an image using light via the incidence face 11 illuminated by the illumination device 1, it is possible to increase the luminance of the image and enhance the contrast.

In this embodiment, since the illumination device 1 includes a plurality of the laser light source devices 2, generation of a speckled pattern can be suppressed.

A high-contrast speckled pattern is formed in space when a rough face or a scattering face including non-uniform media is illuminated by coherent light such as laser light and scattered light is observed.

Scattered lights generated at each point on the scattering face interfere in a mutually random positional relationship, resulting in a complex interference pattern and leading to a possibility that the incidence face 11 will be illuminated with non-uniform illumination distribution.

In this embodiment, since the illumination device 1 includes a plurality of laser light source devices 2 which emit mutually incoherent laser lights, the incidence face 11 is illuminated by lights having mutually different illumination distributions luminance distributions).

Accordingly, when diffracted lights based on these laser lights are made to overlap on the incidence face 11, the speckled pattern is visibly reduced, achieving a substantially uniform illumination distribution on the incidence face 11.

Therefore, the image display device PJ can display an image with few luminance irregularities (illumination irregularities).

By providing the optical element 5, the incidence angle of light against the incidence face 11 can be reduced and the incidence face 11 can be illuminated efficiently.

Furthermore, the diffracted lights L2 generated by the diffractive optical elements 4K can be overlappingly illuminated on a predetermined region on the incidence face 11.

Thus, it is possible to efficiently illuminate the incidence face 11 with high illumination.

Furthermore, generation of speckled patterns can be suppressed, and the incidence face 11 can be illuminated with substantially uniform illumination distribution.

As described above while referring to FIGS. 3A and 3B, since the diffractive optical elements 4K can be manufactured using a nanoimprint method, they can be easily manufactured in large quantities, and the manufacturing cost can be reduced.

Second Embodiment

A second embodiment will be explained while referring to FIG. 7.

In the following explanation, constituent parts which are identical or similar to those of the preceding embodiment are designated with identical reference numerals, and explanation thereof is simplified or omitted.

Figure 7:
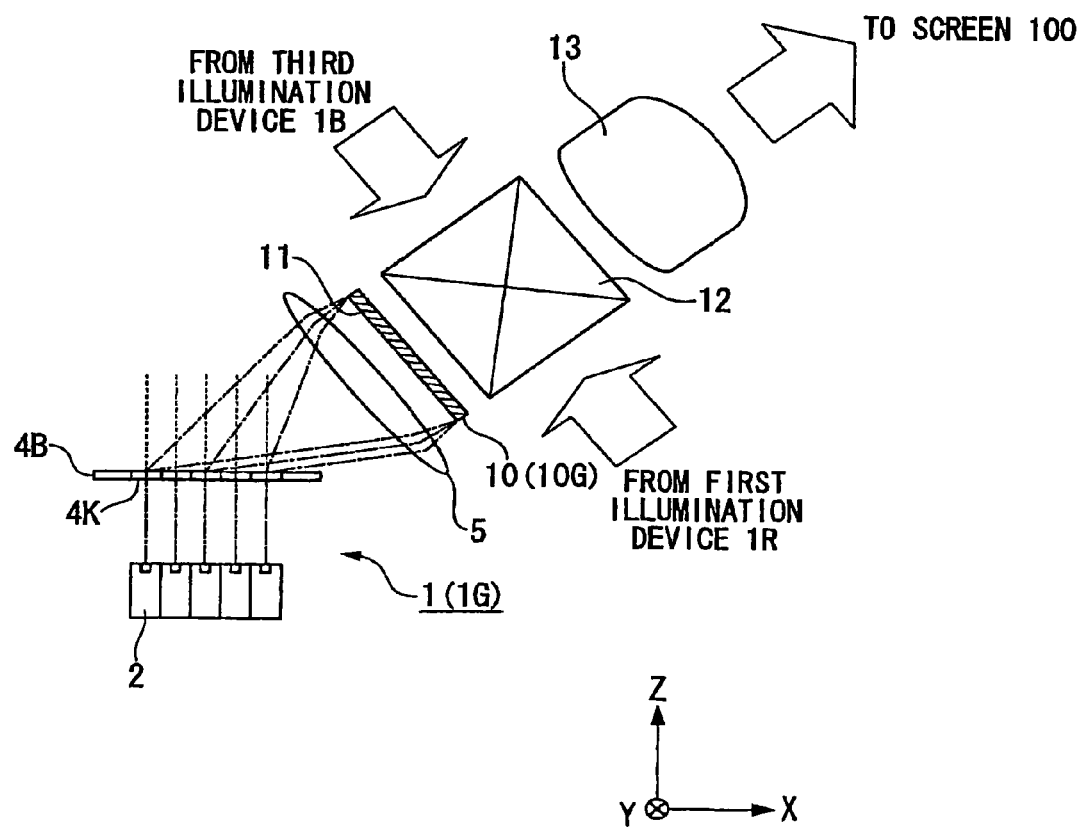
FIG. 7 is a schematic diagram of an image display device according to a second embodiment.

While in the embodiment of FIG. 2 described above, the surface (light-emitting face) of the diffractive optical element 4K and the incidence face 11 of the spatial light modulation device 10 are arranged substantially in parallel, as shown in FIG. 7, the surface (light-emitting face) of the diffractive optical element 4K and the incidence face 11 of the spatial light modulation device 10 may be arranged such that they face in mutually different directions. It is possible to make the device smaller.

Third Embodiment

Subsequently, a third embodiment will be explained while referring to FIG. 8.

Figure 8:
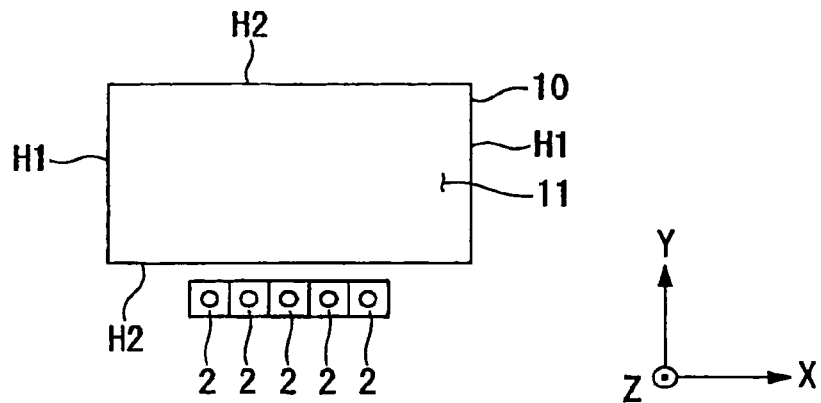
FIG. 8 is a schematic plan view showing an image display device according to a third embodiment.

FIG. 8 is a schematic plan view showing the positional relationship between a spatial light modulation device 10 (incidence face 11) and a plurality of laser light source devices 2.

As shown in FIG. 8, the incidence face 11 has a substantially rectangular (elongated) shape in plan view, having a first side H1 parallel to the Y axis and a second side H2 parallel to the X axis.

Incidentally, "plan view" signifies the shape and positional relationship in a two-dimensional direction along a face.

Thus, the plan view represents the shape and positional relationship in a two-dimensional direction along one face.

Therefore, for example, "the incidence face 11 is substantially rectangular in plan view" signifies that the incidence face 11 is substantially rectangular in a two-dimensional direction.

The second side H2 is longer than the first side H1.

The light-emitting faces of the plurality of laser light source devices 2 are arranged along the second side H2 in plan view.

In this arrangement, since it is possible to position each of the plurality of laser light source devices 2 near the incidence face 11, the incidence face 11 can be illuminated with high illumination and substantially uniform illumination distribution.

Generation of speckled patterns by the laser light source devices 2 can also be suppressed.

Figure 9:
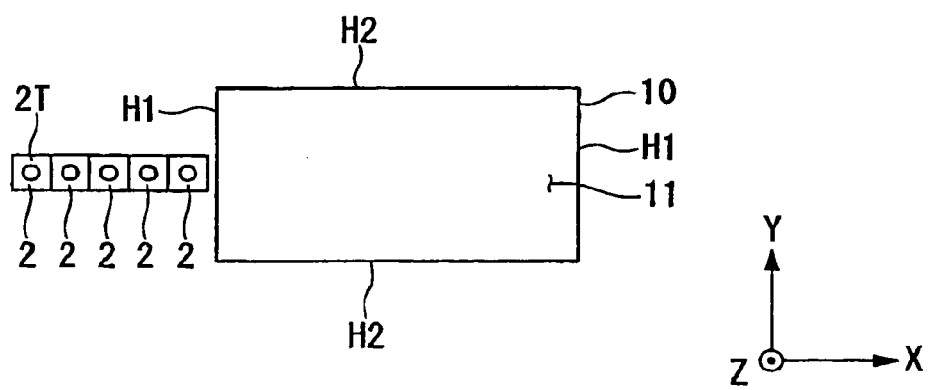
FIG. 9 is a schematic diagram of an example of a positional relationship between a laser light source device and a first face.

As shown in the example of FIG. 9, when the plurality of laser light source devices 2 are arranged in a direction perpendicular to the side of the incidence face 11, there is concern that, on the incidence face 11, there will be a decrease in the illumination of the diffracted light L2, generated by the diffractive optical element 4K based on the laser light L1 emitted from a laser light source device 2T which, of the plurality of laser light source devices 2, is farthest from the incidence face 11.

Thus, since the laser light source device 2T is far from the incidence face 11, of the diffracted light generated based on the laser light L1 emitted from the laser light source device 2T, light which can be made incident on the incidence face 11 may become high-order diffracted light with a large diffraction angle.

Since high-order diffracted light has low diffraction efficiency, its illumination on the incidence face 11 decreases.

Generally, when "α" is the width of the reentrant portions 4M (slits) in the diffractive grating, "d" is the pitch between the reentrant portions 4M in the diffractive grating, "M" is the number of reentrant portions 4M in a range where light is incident, "$I_0$" is the light intensity incident on the diffractive grating, "$I_P$" is the light intensity emitted from the diffractive grating, "$\theta_n$" is the angle (diffraction angle) of Nth-order diffracted light, and "$\theta_0$" is the incidence angle of laser light against the diffractive grating, the following equations (1) and (2) are established.

$$P = \sin\theta_n - \sin\theta_0 = \frac{N\lambda}{d} \quad (N = 0, \pm 1, \pm 2, \ldots) \tag{1}$$

$$I_p = I_0 \left\{ \frac{\sin\left(\frac{\pi \alpha P}{\lambda}\right)}{\left(\frac{\pi \alpha P}{\lambda}\right)} \right\}^2 \times 2 \left\{ \frac{\sin\left(\frac{\pi M d P}{\lambda}\right)}{M \sin\left(\frac{\pi d P}{\lambda}\right)} \right\}^2 \tag{2}$$

Thus, high-order diffracted light reduces the diffraction efficiency (ratio between incident light intensity and emitted light intensity=$I_P/I_0$).

Using an arrangement such as that shown in FIG. 8, it is possible to prevent the arrangement in which the laser light source devices 2 is arranged at positions noticeably far from the incidence face 11, and it is possible to provide each of the plurality of laser light source devices 2 at a position near to the incidence face 11.

Therefore, low-order diffracted light (primary light) can be made incident on the incidence face 11, and it is possible to suppress decrease of the diffraction efficiency accompanying an increase in the diffraction angle, and thereby suppress decrease of the light intensity (illumination) incident on the incidence face 11.

In the embodiment of FIG. 8, the plurality of laser light source devices 2 are arranged along one side, and the incidence face 11 is illuminated from only one direction (−Y direction). Thus, it is possible to make the device smaller.

While in the embodiment of FIG. 8, the plurality of laser light source devices 2 are arranged along the second side H2, they can be arranged along the first side H1 after considering the arrangement of the members.

Fourth Embodiment

Subsequently, a fourth embodiment will be explained while referring to FIGS. 10 and 11.

Figure 10:
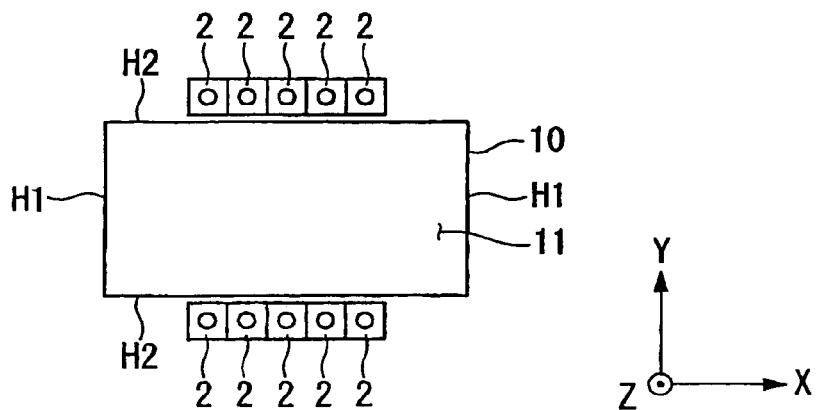
FIG. 10 is a schematic plan view showing an image display device according to a fourth embodiment.
Figure 11:
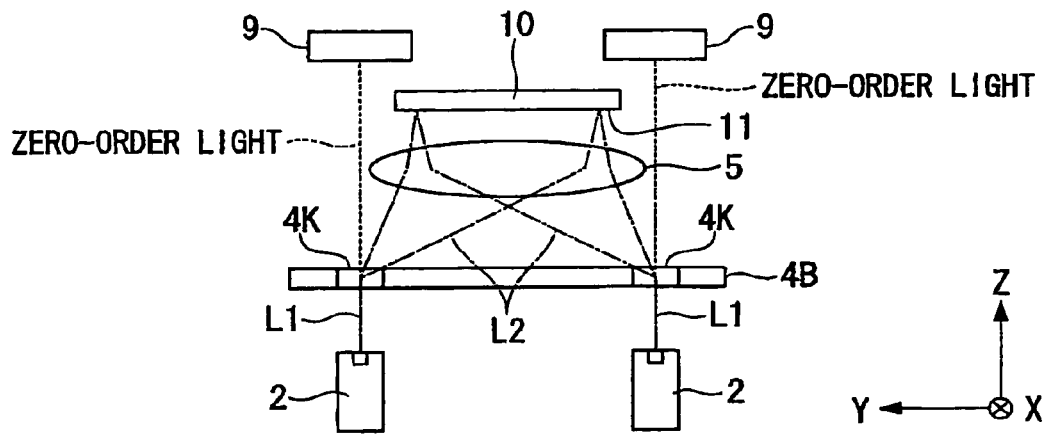
FIG. 11 is a schematic cross-sectional view showing an image display device according to a fourth embodiment.

FIG. 10 is a schematic plan view showing the positional relationship between the spatial light modulation device 10 (incidence face 11) and the plurality of laser light source devices 2, and FIG. 11 is a cross-sectional view.

In this embodiment, light-emitting faces of the plurality of laser light source devices 2 are aligned along mutually opposing second sides H2 of the incidence face 11.

As shown in FIG. 11, laser lights L1 emitted from the plurality of laser light source devices 2 are converted to diffracted lights L2 by the diffractive optical elements 4K, and are incident upon the incidence face 11 via the optical element 5.

The plurality of laser light source devices 2 are arranged along two sides, and illuminate the incidence face 11 from two directions (the +Y direction and the −Y direction).

By illuminating the incidence face 11 from two directions in this manner, the incidence face 11 can be illuminated with uniform illumination distribution having low polarization.

Furthermore, the illumination device 1 can illuminate the incidence face 11 with high illumination.

As shown in FIG. 11, in this embodiment, a light-intercepting member 9 is arranged on the extension line of the laser light L1 incident on the diffractive optical element 4K.

Therefore, even if zero-order light is emitted from the diffractive optical element 4K, it is possible to intercept by the light-intercepting member 9.

Therefore, problems such as zero-order light reaching the screen 100 or the like can be prevented.

In the first to the fourth embodiments described above, the light-intercepting member shown in FIG. 11 can be arranged on the optical path of the zero-order light emitted from the diffractive optical elements 4K.

Fifth Embodiment

Subsequently, a fifth embodiment will be explained while referring to FIG. 12.

Figure 12:
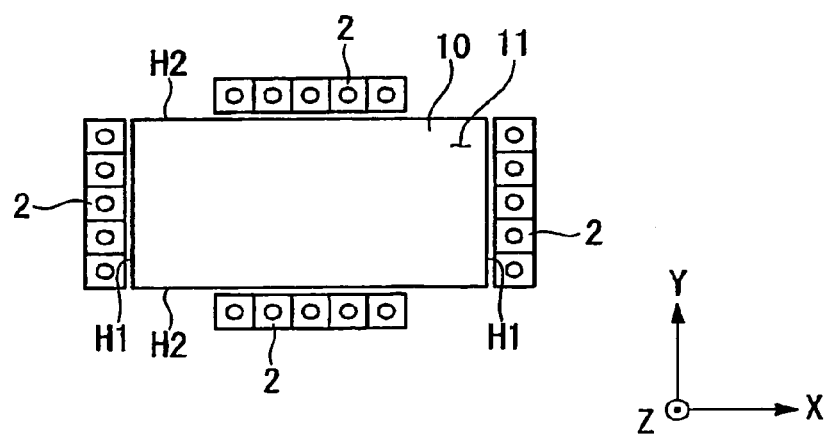
FIG. 12 is a schematic plan view showing an image display device according to a fifth embodiment.

FIG. 12 is a schematic plan view of the positional relationship between a spatial light modulation device 10 (incidence face 11) and the plurality of laser light source devices 2.

In FIG. 12, the incidence face 11 includes two pairs of mutually opposing sides, namely mutually opposing first sides H1 and mutually opposing second sides H2.

The light-emitting faces of the plurality of laser light source devices 2 are aligned along the first and second sides H1 and H2 in plan view.

The plurality of laser light source devices 2 can illuminate the incidence face 11 from four directions.

By illuminating the incidence face 11 from a plurality of directions (four directions) in this manner, the incidence face 11 can be illuminated with uniform illumination distribution having low polarization.

Furthermore, the illumination device 1 can illuminate the incidence face 11 with high illumination.

In the third to the fifth embodiments described above, a control device may be provided to control the operations of the plurality of laser light source devices 2, and the light-emission operations of the plurality of laser light source devices 2 may be controlled using this control device.

For example, when the laser light source devices 2 are arranged along the first and second sides H1 and H2 as shown in FIG. 12, the control device may allow emission of laser light from only some of the laser light source devices 2 among the plurality of laser light source devices 2, if necessary.

While in the first to the fifth embodiments described above, phase modulation type diffractive optical elements are used as the transmission type diffractive optical elements (diffractive gratings) forming the diffractive optical elements, amplitude modulation type diffractive optical elements can be used instead.

The transmission type diffractive optical elements are not limitative of the invention, and reflection type diffractive optical elements can also be used.

It is also acceptable, for example, to combine transmission type diffractive optical elements with reflection type diffractive optical elements.

By optimizing the surface conditions of the diffractive optical elements, they can be given desired functions.

While in each of the above embodiments, a transmission type liquid crystal device (light valve) is used as the spatial light modulation device, a reflection type liquid crystal device can also be used, and a reflection type light modulation device (mirror modulator) such as a digital micro-mirror device (DMD) may also be used.

While each of the above embodiments describes an example of a frontal projection type projector which emits light containing image information on the screen 100 from the front face side of the screen 100.

The illumination device 1 of the above embodiments can also be applied in a so-called rear projector including a projection unit U, a screen 100, and a casing. In this rear projector, the projection unit U is arranged on a rear face side of the screen 100, and light containing image information is emitted on the screen 100 from the rear face side.

Incidentally, while the projector PJ of the embodiments described above includes the first, second, and third illumination devices 1R, 1G, and 1B which each include the laser light source devices 2 capable of emitting lights of basic colors (R, G, and B).

It is acceptable if the configuration includes one illumination device having a red laser light source device for emitting red light (R), a green laser light source device for emitting green light (G), and a blue laser light source device for emitting blue light (B) are arranged in an array.

In this case, the laser light emission operations of the laser light source devices capable of emitting lights of basic colors are performed in time slots, and the operation of the light valve is controlled in synchronism with the laser light emission operation of the laser light source device, thereby it is possible to display a full-color image on the screen 100 by using one illumination device and one light valve.

Sixth Embodiment

While in the above embodiments, the illumination device 1 illuminates the spatial light modulation device, and light transmitted through the spatial light modulation device displays an image on the screen 100. In the image display device (projector), a spatial light modulation device may be omitted.

Figure 13:
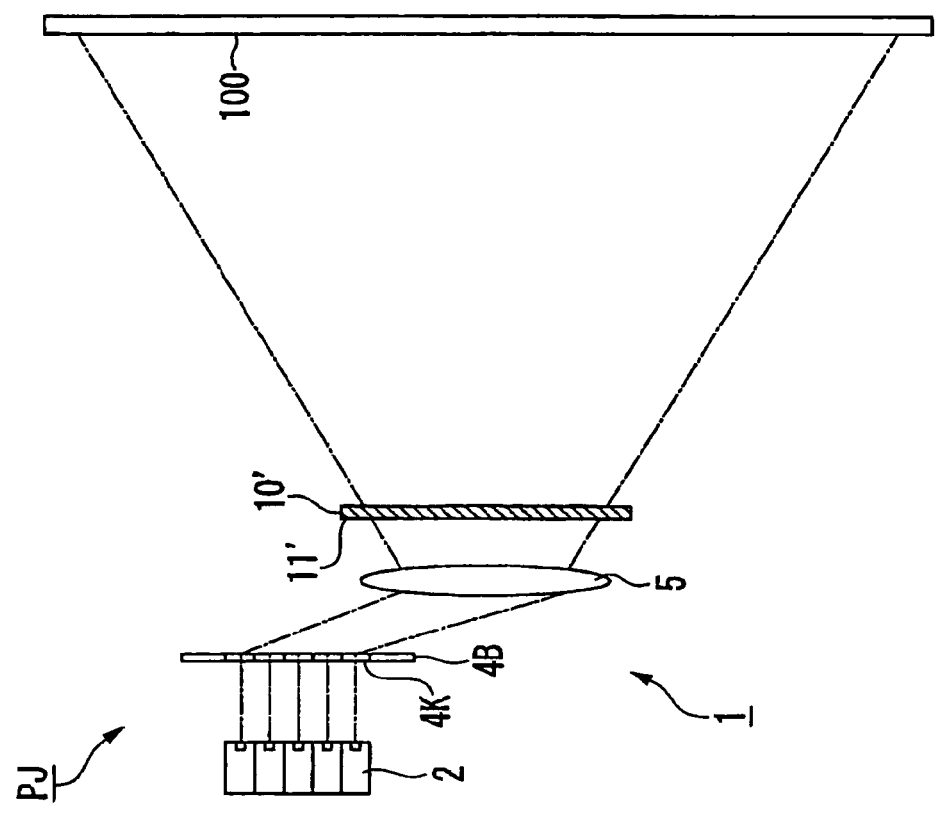
FIG. 13 is a schematic diagram of an image display device according to a sixth embodiment.

As shown in the example of FIG. 13, the illumination device 1 of the above embodiments can be applied in a so-called slide projector, which uses an illumination device 1 to illuminate a face 11' of a slide (positive film) 10' containing image information, and projects light containing the image information on a screen 100.

A direct-view type image display device, which does not include a projection system and allows an image from a spatial light modulation device to be observed directly, may be used as the image display device.

While in the first to the sixth embodiments described above, the optical element 5 is provided between the diffractive optical element 4K and the incidence face 11, the optical element 5 may be omitted.

By optimizing the diffractive optical element 4K, the diffracted light (primary light) L2 generated by the diffractive optical element 4K can be made to illuminate the incidence face 11 in a desired state.

Seventh Embodiment

While in the embodiments described above, in order to provide the incidence face 11 at a position on which zero-order light emitted from the diffractive optical element 4K will not be incident, the incidence face 11 is provided at a position separated from the extension line of the laser light which is incident to the diffractive optical element 4K. In the case in which the diffractive optical element emits zero-order in an oblique direction, the incidence face 11 may be provided on the extension line of the laser light which is incident on the diffractive optical element 4K.

Thus, zero-order light emitted from the diffractive optical element 4K need only be prevented from being incident on the incidence face 11.

Figure 14:
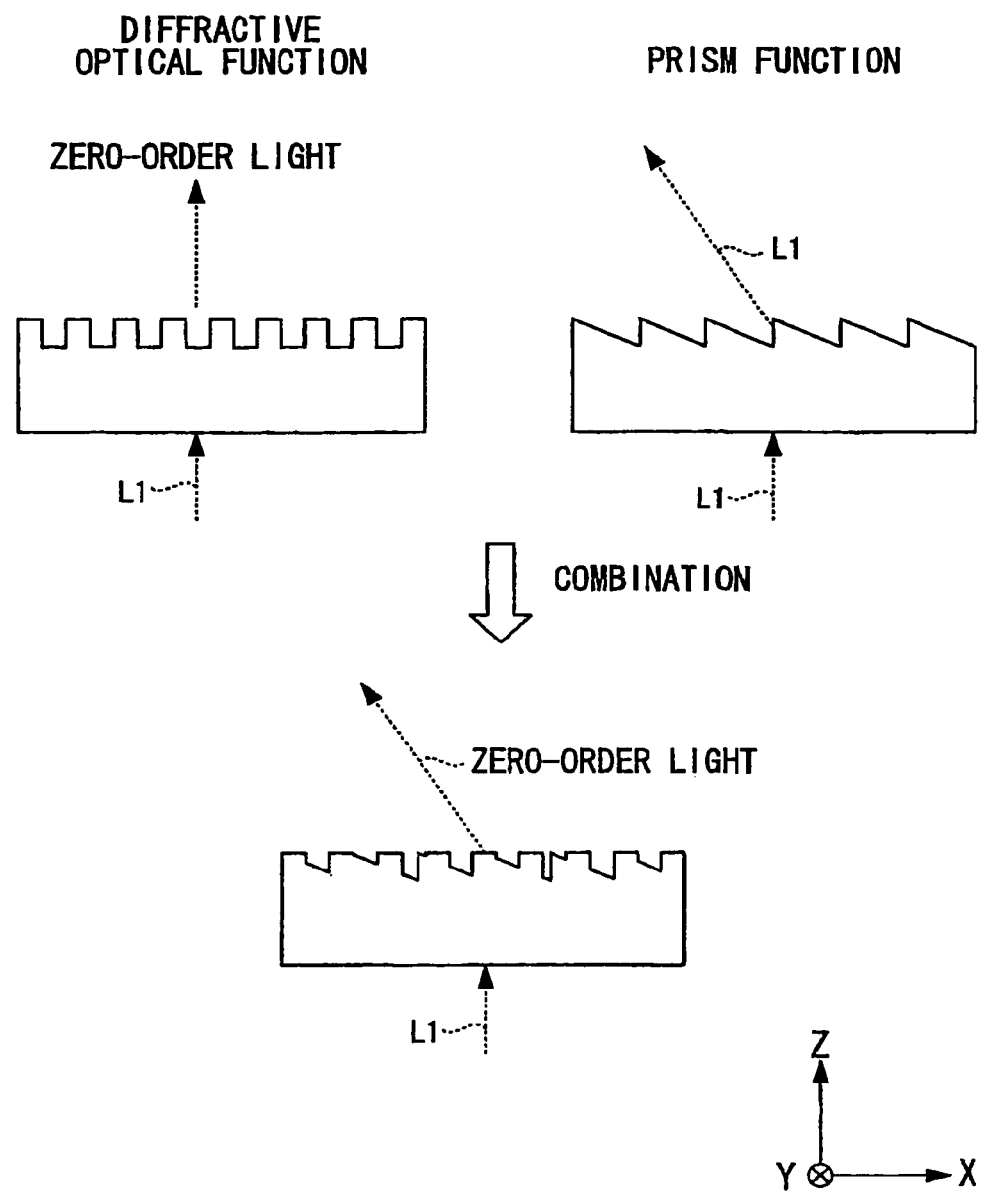
FIG. 14 is a schematic diagram for explanation of an example of a diffractive optical element according to a seventh embodiment.

For example, as shown in the schematic diagram of FIG. 14, by giving the diffractive optical element 4K a diffractive optical function and a prism function, even when zero-order light is emitted from the diffractive optical element 4K, the diffractive optical element 4K can emit the zero-order light in a direction (diagonal to the Z-axis in FIG. 14) which is different to the incident direction (Z-axis direction) of the laser light L1 to the diffractive optical element 4K.

Figure 15:
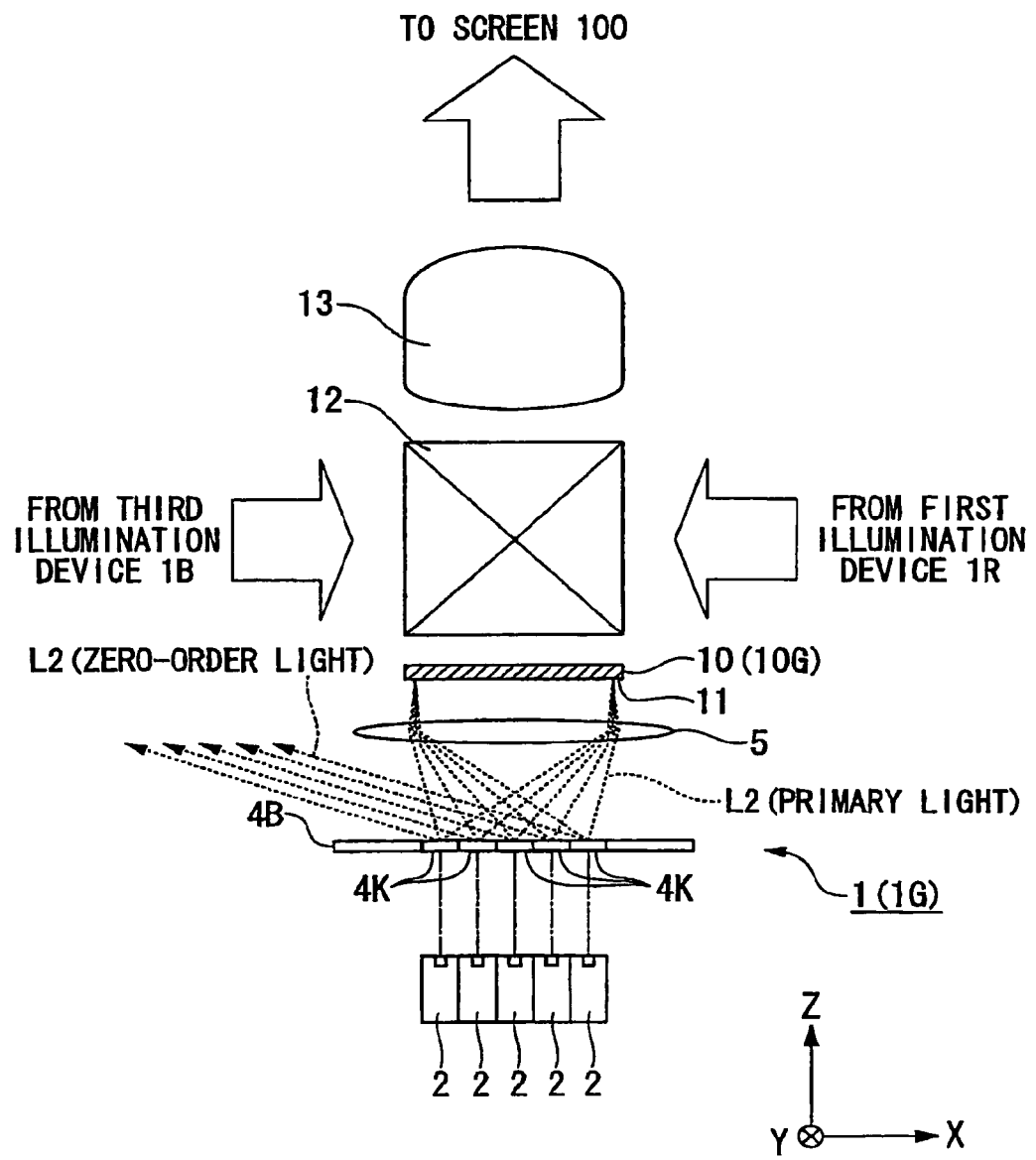
FIG. 15 is a schematic diagram of an image display device according to the seventh embodiment.

By using such a diffractive optical element 4K, even when the incidence face 11 is provided on the extension line of the laser light L1 incident on the diffractive optical element 4K as shown in FIG. 15, it is possible to prevent the zero-order light emitted from the diffractive optical element 4K to be incident on the incidence face 11.

By adjusting the diffractive optical element 4K such that the incidence face 11 can be illuminated with primary light generated from the diffractive optical element 4K, the incidence face 11 provided on the extension line of the laser light L1 which is incident on the diffractive optical element 4K can be illuminated by the primary light.

Furthermore, the incidence face (light valve 10) 11 and the diffractive optical element 4K can be aligned with the plurality of laser light source devices 2, and it is possible to make the entire image display device more compact.

While in each of the embodiments described above, the incidence face 11 is illuminated by primary light generated from the diffractive optical element 4K, the incidence face 11 may be illuminated by light other than primary light, such as secondary light and tertiary light.

Eighth Embodiment

An eighth embodiment will be explained.

In the embodiment explained below, explanation relating to configurations which are identical to those of the preceding embodiments is omitted.

Figure 16:
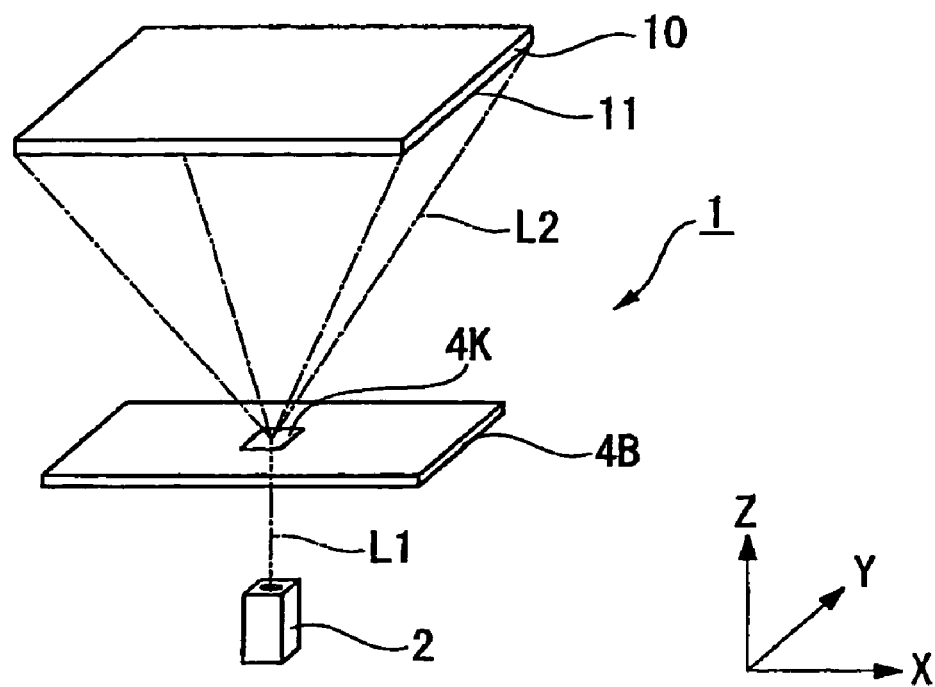
FIG. 16 is a schematic perspective view of a configuration of an illumination device according to an eighth embodiment.

FIG. 16 is a schematic perspective view of an illumination device according to an eighth embodiment.

In FIG. 16, an illumination device 1 illuminates an incidence face 11 of a predetermined member 10, and includes a laser light source device 2 emitting laser light L1, and a diffractive optical element 4K on which the laser light L1 emitted from the laser light source device 2 is incident, generating diffracted light L2 from the incident laser light L1, and using the diffracted light L2 to illuminate a predetermined illumination region on the incidence face 11.

The diffractive optical element 4K is supported by a supporting member 4B.

Optical members are not provided between the laser light source device 2 and the diffractive optical element 4K. The laser light L1 emitted from the laser light source device 2 is directly incident on the diffractive optical element 4K.

The diffractive optical element 4K generates the diffracted light L2 from the laser light L1 emitted by the laser light source device 2, and illuminates a predetermined illumination region on the incidence face 11 using the diffracted light L2.

The diffracted light L2 generated by the diffractive optical element 4K is diffused light. The diffractive optical element 4K illuminates the predetermined illumination region on the incidence face 11 using the diffused light (diffracted light) L2, and uniformizes the illumination of the illumination region.

The illumination region of the incidence face 11 illuminated by the diffractive optical element 4K is larger than an emission region from which light from a light-emitting face of the diffractive optical element 4K is emitted.

Thus, the diffractive optical element 4K is a so-called enlargement system (enlargement illumination system).

In this embodiment, the diffractive optical element 4K illuminates a rectangular illumination region on the incidence face 11.

Figure 17:
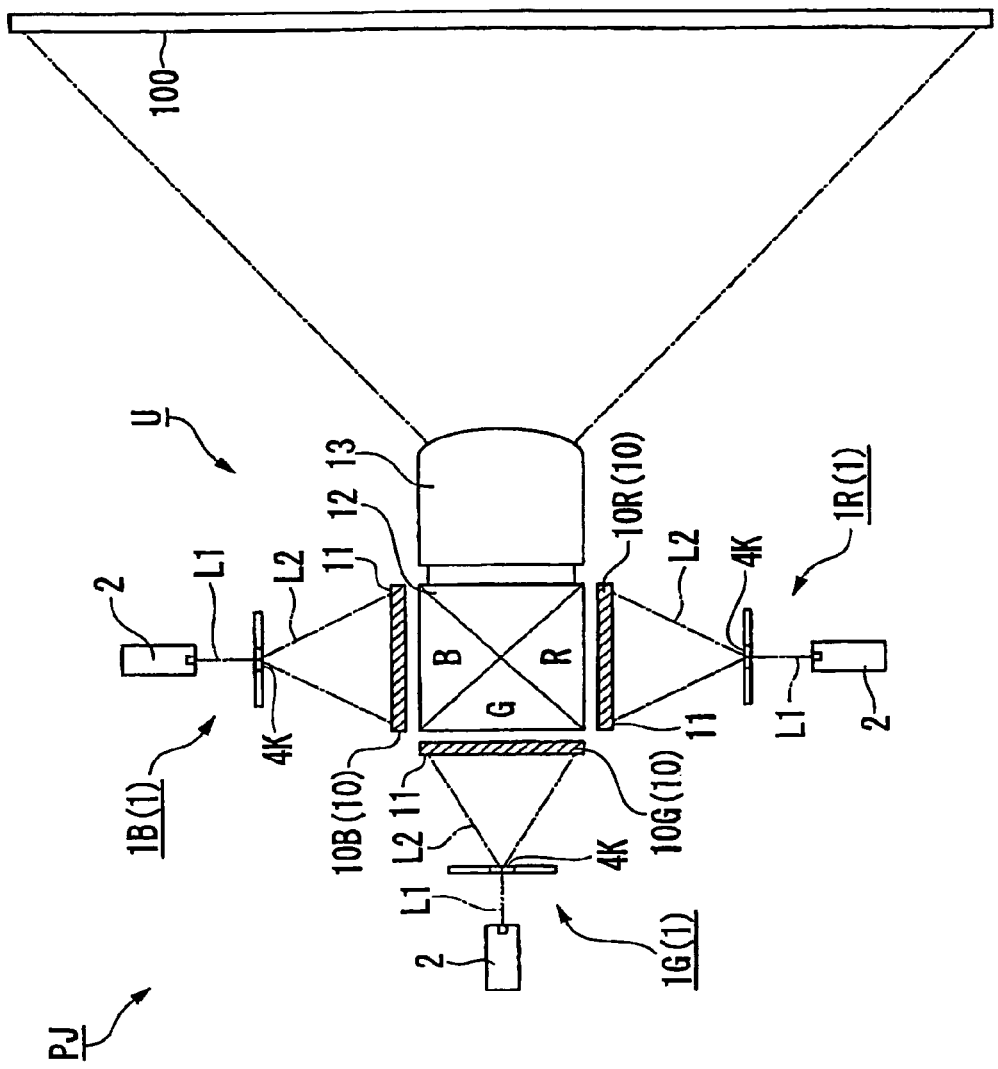
FIG. 17 is a schematic diagram of an image display device including the illumination device according to the eighth embodiment.

FIG. 17 is a schematic diagram of an image display device including illumination devices 1 (1R, 1G, and 1B) according to this embodiment.

As an example of an image display device, this embodiment describes a projection type image display device (projector) which projects colored light containing image information generated by a spatial light modulation device via a projection system on a screen.

In FIG. 17, a projection type image display device PJ includes a projection unit U which projects the light containing image information on a screen 100 (second face).

By projecting the light from the projection unit U on the screen 100, an image is formed on the screen 100.

The projector PJ of this embodiment uses a transmission type screen as the screen 100, and projects the light containing image information on the screen 100 from a front face side thereof.

The projection unit U includes a first illumination device 1R which can illuminate a first face with light of a first basic color (red light), a second illumination device 1G which can illuminate the first face with light of a second basic color (green light), a third illumination device 1B which can illuminate the first face with light of a third basic color light (blue light), a first spatial light modulation device 10R which has an incidence face (first face) 11 illuminated by the first illumination device 1R, and modulates illuminated light in accordance with image information, a second spatial light modulation device 10G which has an incidence face (first face) 11 illuminated by the second illumination device 1G, and modulates illuminated light in accordance with image information, a third spatial light modulation device 10B which has an incidence face (first face) 11 illuminated by the third illumination device 1B, and modulates illuminated light in accordance with image information, a color synthesis system 12 which synthesizes the basic color lighted lights modulated by the spatial light modulation devices 10R, 10G, and 10B, and a projection system 13 which projects the light generated by the color synthesis system 12 on the screen 100.

Each of the spatial light modulation devices 10R, 10G, and 10B contains a liquid crystal device.

For convenience in the following explanation, "spatial light modulation device" is termed "light valve".

A light valve includes an incidence side polarization plate, a panel including a liquid crystal sealed between a pair of glass substrates, and an emission side polarizing plate.

Pixel electrodes and orientation films are provided on the glass substrates.

The light valves constituting the spatial light modulation devices allow transmission only of light in a predetermined oscillation direction, and lights of basic colors which are incident on the light valves are modulated as they pass through them.

The laser light source devices 2 of the first illumination device 1R emit red (R) laser light.

The first illumination device 1R uses the diffractive optical element 4K to generate, from the red laser light, diffracted light which illuminates a desired region, and illuminates the incidence face 11 of the first light valve 10R with this generated diffracted light via the optical element 5.

The laser light source devices 2 of the second illumination device 1G emit green (G) laser light.

The second illumination device 1G uses the diffractive optical element 4K to generate, from the green laser light, diffracted light which illuminates a desired region, and illuminates the incidence face 11 of the second light valve 10G with this generated diffracted light via the optical element 5.

The laser light source devices 2 of the third illumination device 1B emit blue (B) laser light.

The third illumination device 1B uses the diffractive optical element 4K to generate, from the blue laser light, diffracted light which illuminates a desired region, and illuminates the incidence face 11 of the third light valve 10B with this generated diffracted light via the optical element 5.

The lights of basic colors which are modulated by passing through the light valves 10R, 10G, and 10B (modulated lights) are synthesized by the color synthesis system 12.

The color synthesis system 12 includes a dichroic prism, and synthesizes the red light (R), the green light (G), and the blue light (B) into full-color synthesized light.

The full-color synthesized light emitted from the color synthesis system 12 is supplied to the projection system 13.

The projection system 13 projects the full-color synthesized light on the screen 100.

The projection system 13 is a so-called enlargement system which enlarges the image on the incidence side and projects it on the screen 100.

The projection unit U uses the projection system 13 to project the full-color synthesized light, which contains image information transmitted via the light valves 10R, 10G, and 10B respectively illuminated by the illumination devices 1R, 1G, and 1B, on the screen 100, and thereby forms a full-color image on the screen 100.

An observer views the image emitted on the screen 100 via the projection unit U.

As described above according to the illumination device 1 of this embodiment, increase in the size and complexity of the device, or increase in its cost, can be suppressed, and the first face (incidence face of the light valve) can be illuminated efficiently with uniform illumination distribution.

Thus, when an optical system such as a rod integrator and a fly-eye lens is used to illuminate the first face 1 with uniform illumination distribution using laser light emitted from the laser light source devices, the number of components and the complexity of the optical system are liable to increase, there is concern that the size and the complexity of the overall device may also increase.

There is also concern that increasing the number of components and using expensive components such as a rod integrator will increase the cost of the device.

Moreover, there is concern that of Fresnel reflection loss and the like generated from the interfaces between the optical elements, and of a decrease in the light utilization efficiency and the like are occurred.

In this embodiment, since comparatively inexpensive optical elements are used and the number of components is suppressed, it is possible to suppress increases in the size and complexity of the device, or increase in the device cost, and efficiently illuminate the first face 11.

Furthermore, since the diffractive optical element 4K can set the illumination region LA on the first face 11, the illumination region LA can be efficiently illuminated.

Thus, when the first face 11 is illuminated by light via a lens or the like, there is concern that the shape of the illumination region LA may differ from the shape of the first face 11.

For example, while the first face 11 is rectangular, illumination via the lens may obtain a circular illumination region LA.

In this case, in order to illuminate the first face 11 while suppressing leakage of light, the circular illumination region LA must be enlarged and shaped using a light-intercepting member and the like. This reduces the light utilization efficiency.

In this embodiment, by using the diffractive optical element 4K to set the illumination region LA, almost all of the light generated by the diffractive optical element 4K can be illuminated onto the first face 11, and it is possible to increase the light utilization efficiency.

Furthermore, since a laser light source device is used as the light source, polarized light can be emitted, and, in comparison with a configuration using a white-light source such as an ultrahigh frequency mercury lamp as the light source, components such a polarization dividing element (polarization beam splitter) and a color dividing element (dichroic mirror) can be omitted.

Since laser light (basic color light) of a narrow wavelength band is emitted, superior color reproduction can be obtained when displaying an image using this laser light.

Furthermore, since ultraviolet light is not irradiated to the liquid crystal devices (light valves), deterioration of the light valves can be suppressed.

Furthermore, as described with reference to FIGS. 6A to 6D, since the diffractive optical element 4K can be manufactured by a nanoimprint method, it is possible to easily manufacture in large quantities, and manufacturing costs can be reduced.

Ninth Embodiment

A ninth embodiment will be explained.

In the following explanation, constituent parts which are identical or similar to those of the preceding embodiment are designated with identical reference numerals, and explanation thereof is simplified or omitted.

Figure 18A:
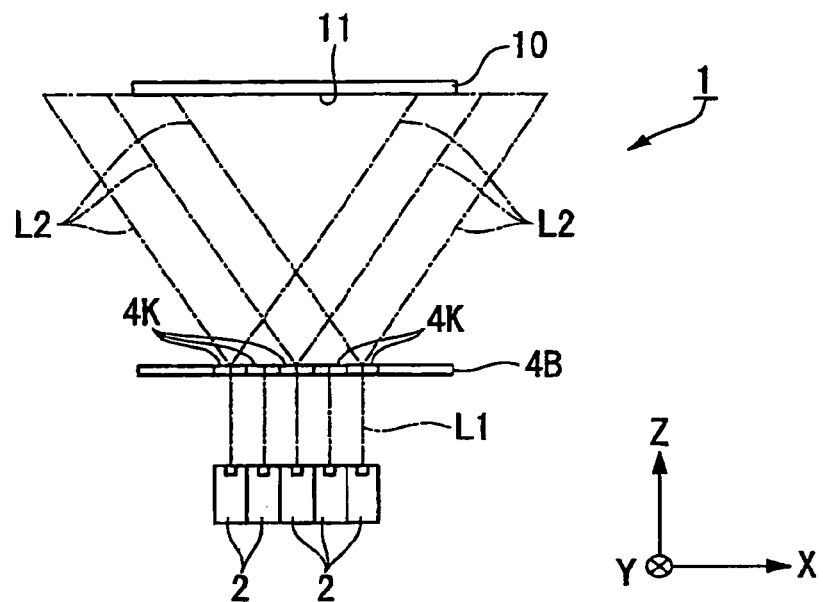
FIGS. 18A and 18B are schematic diagrams of an illumination device according to a ninth embodiment.
Figure 18B:
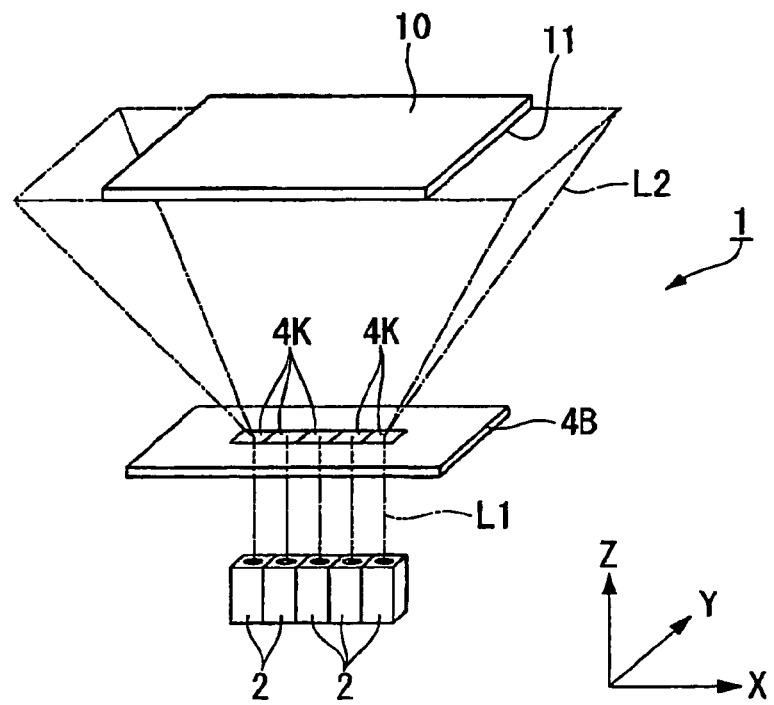

FIGS. 18A and 18B are schematic diagrams of an illumination device 1 according to a ninth embodiment, in particular, FIG. 18A is a cross-sectional view, and FIG. 18B is a perspective view.

In FIGS. 18A and 18B, the illumination device 1 includes a plurality of laser light source devices 2.

The laser light source devices 2 are arranged in an array. In this embodiment the laser light source devices 2 are aligned in a one-dimensional direction (X direction).

Light-emitting faces of the laser light source devices 2 face a +Z side, and the laser light source devices 2 emit light toward the +Z direction.

A plurality of the diffractive optical elements 4K are provided in correspondence with the plurality of laser light source devices 2.

In the example of FIGS. 18A and 18B, the plurality of laser light source devices 2 are aligned in a one-dimensional direction (X-axis direction), and a plurality of the diffractive optical elements 4K are aligned in correspondence with the plurality of laser light source devices 2 in a one-dimensional direction (X-axis direction) on a supporting member 4B.

The diffractive optical elements 4K are optimized in accordance with the positions, characteristics, and the like of the plurality of laser light source devices 2.

As the preceding embodiments, each of the plurality of diffractive optical elements 4K can set an illumination region to a rectangular shape.

The laser lights L1 emitted from the laser light source devices 2 are converted by the diffractive optical elements 4K to diffracted lights L2 which illuminate desired regions, and thereafter illuminate the first face 11.

Thus, a plurality of the light-emitting faces of the laser light source devices 2 may be arranged in an array.

Thereby, it is possible to increase the quantity of light, and illuminate the first face 11 with high illumination.

The illumination device 1 illuminates the first face (including the incidence face of the light valve) 11 which contains the image information, and thereby the projector PJ can display a high-luminance image.

By providing a plurality of the laser light source devices 2, the amount of light (illumination) on the first face 11 can be increased.

By displaying an image using light via the first face (incidence face of the light valve) 11 which is illuminated by the illumination device 1, it is possible to enhance the precision and contrast of the image.

In this embodiment, since the illumination device 1 includes the plurality of laser light source devices 2, generation of a speckled pattern can be suppressed.

A high-contrast speckled pattern is formed in space when a rough face or a scattering face including uneven media is illuminated by coherent light such as laser light and the scattered light (diffused light) is observed.

Scattered lights generated at each point on the scattering face interfere in mutually random positional relationships, resulting in a complex interference pattern and leading to a possibility that the first face 11 will be illuminated with non-uniform illumination distribution.

In this embodiment, since the illumination device 1 includes the plurality of laser light source devices 2 which emit mutually incoherent laser lights, the first face 11 is illuminated by lights having mutually different illumination distributions (luminance distributions).

Accordingly, when diffracted lights based on these laser lights are made to overlap on the first face 11, the speckled pattern is visibly reduced, achieving a substantially uniform illumination distribution on the first face 11.

Therefore, the image display device PJ can display an image with few luminance irregularities (illumination irregularities).

Tenth Embodiment

A tenth embodiment will be explained.

Figure 19A:
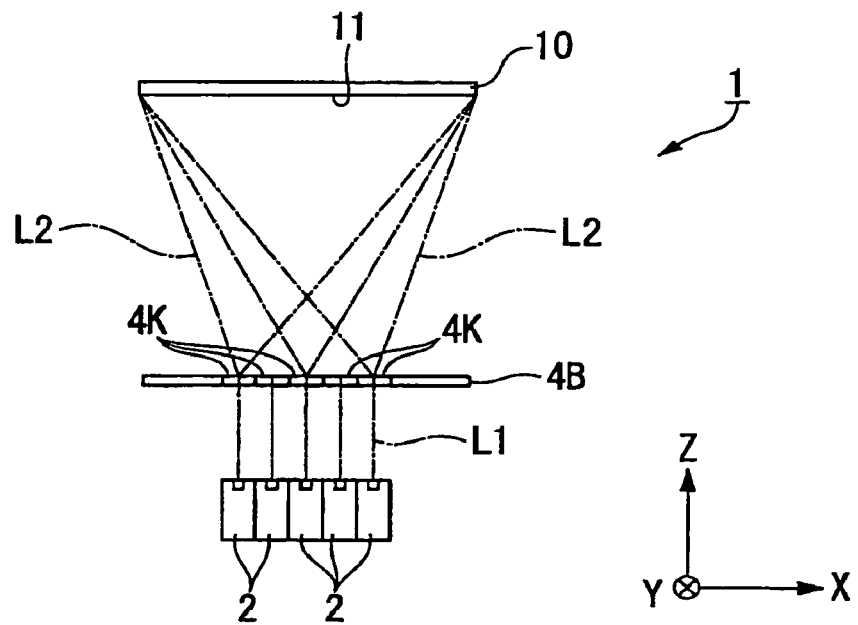
FIGS. 19A and 19B are schematic diagrams of an illumination device according to a tenth embodiment.
Figure 19B:
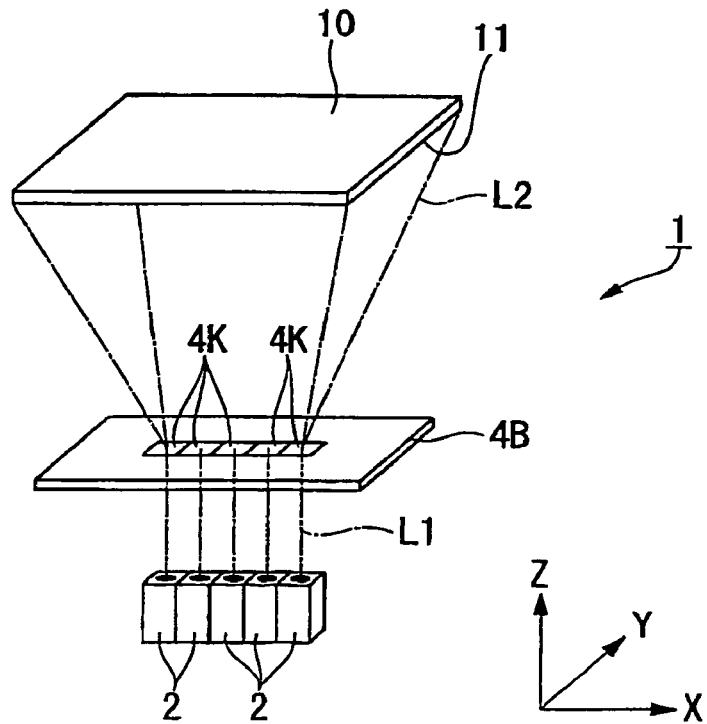

FIGS. 19A and 19B are schematic diagrams of an illumination device 1 according to a tenth embodiment, in particular, FIG. 19A is a cross-sectional view, and FIG. 19B is a perspective view.

In FIGS. 19A and 19B, the illumination device 1 includes a plurality of laser light source devices 2.

The laser light source devices 2 are arranged in an array. In this embodiment, the laser light source devices 2 are aligned in a one-dimensional direction (X direction).

Light-emitting faces of the laser light source devices 2 face a +Z side, and the laser light source devices 2 emit light toward the +Z direction.

A plurality of the diffractive optical elements 4K are provided in correspondence with the plurality of laser light source devices 2.

In the example of FIGS. 19A and 19B, the plurality of laser light source devices 2 are aligned in a one-dimensional direction (X-axis direction), and a plurality of the diffractive optical elements 4K are aligned in correspondence with the plurality of laser light source devices 2 in a one-dimensional direction (X-axis direction) on a supporting member 4B.

The plurality of diffractive optical elements 4K are optimized in accordance with the positions, characteristics, and the like of the plurality of laser light source devices 2.

Surface conditions of the plurality of diffractive optical elements 4K (including the pitch "d" between the reentrant portions 4M and the depth "t" of the reentrant portions 4M) are optimized such that they can overlappingly illuminate a predetermined region on the first face 11 using diffracted light L2, which they generate based on the laser light L1 emitted from the plurality of laser light source devices 2.

An example of a design method of optimizing the surface conditions of the diffractive optical elements 4K is a predetermined computation method, such as the abovementioned repetitive Fourier.

As the embodiments described above, each of the plurality of diffractive optical elements 4K can set an illumination region to a rectangular shape.

The laser lights L1 emitted from the laser light source devices 2 are converted by the diffractive optical elements 4K to the diffracted lights L2 which illuminate a predetermined region, and are illuminated on the first face 11.

Thus, a predetermined region on the first face 11 can be overlappingly illuminated by the diffracted lights L2 generated by the plurality of diffractive optical elements 4K. It is possible to efficiently illuminate the first face 11 with high illumination.

Furthermore, a speckled pattern can be suppressed, and the first face 11 can be illuminated with substantially uniform luminance distribution.

Eleventh Embodiment

An eleventh embodiment will be explained while referring to FIGS. 20A and 20B.

Figure 20A:
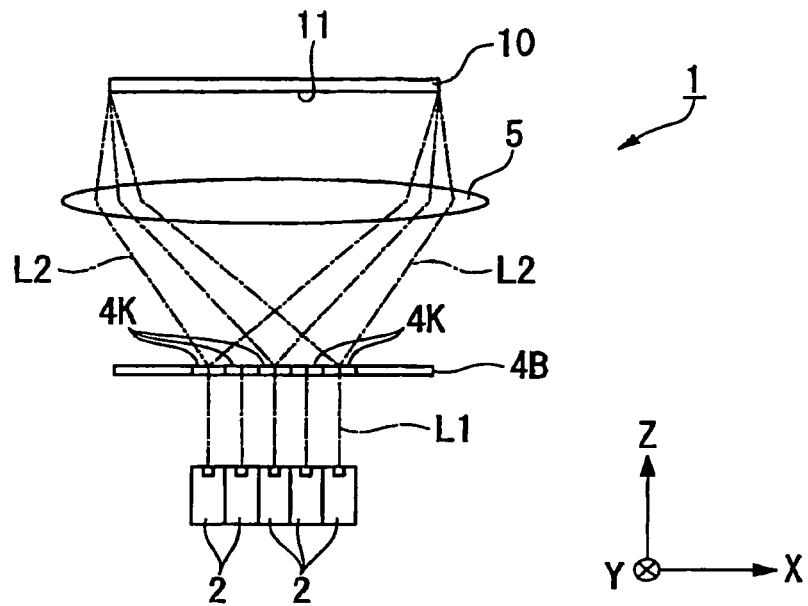
FIGS. 20A and 20B are schematic diagrams of an illumination device according to an eleventh embodiment.
Figure 20B:
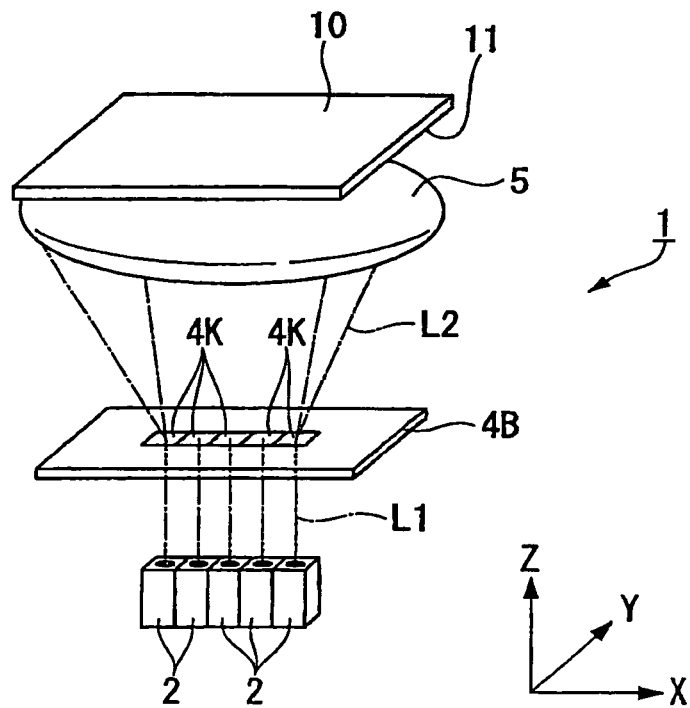
Figure 21:
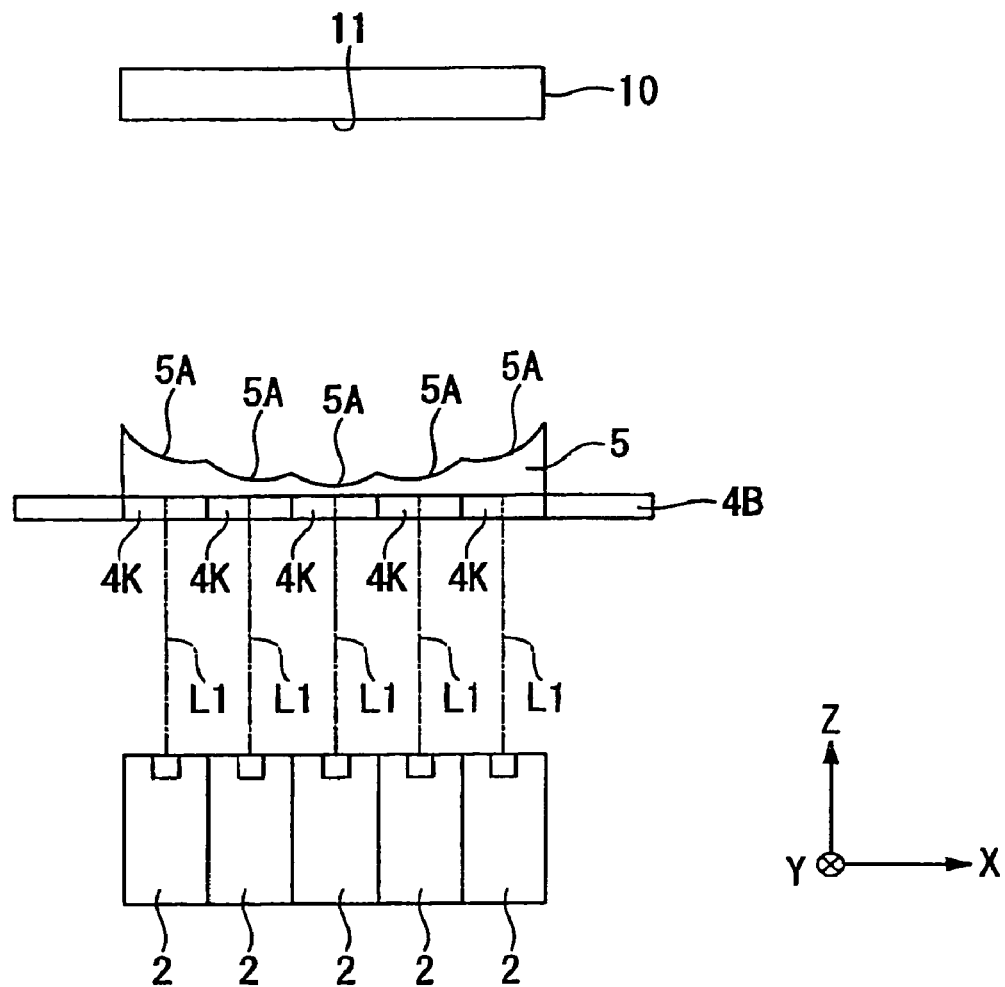
FIG. 21 is a schematic diagram of an illumination device according to the eleventh embodiment.

FIGS. 20A and 20B are schematic diagrams of an illumination device 1 according to an eleventh embodiment, in particular, FIG. 20A is a cross-sectional view, and FIG. 20B is a perspective view.

This embodiment is characterized in that an angle adjusting optical element 5 is provided between the diffractive optical elements 4K and the first face 11. This angle adjusting optical element 5 is illuminated by the light from the diffractive optical element 4K, and also adjusts the emission angle of the light it emits.

In FIGS. 20A and 20B, the illumination device 1 includes a plurality of laser light source devices 2.

The laser light source devices 2 are arranged in an array. In this embodiment, they are aligned in a one-dimensional direction (X direction).

Light-emitting faces of the laser light source devices 2 face a +Z side, and the laser light source devices 2 emit light toward the +Z direction.

A plurality of the diffractive optical elements 4K are provided in correspondence with the plurality of laser light source devices 2.

In the example shown in FIGS. 20A and 20B, the plurality of laser light source devices 2 are aligned in a one-dimensional direction (X-axis direction), and a plurality of the diffractive optical elements 4K are aligned in correspondence with the plurality of laser light source devices 2 in a one-dimensional direction (X-axis direction) on a supporting member 4B.

The plurality of diffractive optical elements 4K are optimized in accordance with the positions, characteristics, and the like of the plurality of laser light source devices 2.

As in the embodiments described above, each of the plurality of diffractive optical elements 4K can set an illumination region to a rectangular shape.

The laser lights L1 emitted from the laser light source devices 2 are converted by the diffractive optical elements 4K to the diffracted lights L2 which illuminate a predetermined region, and are incident on the angle adjusting optical element 5.

While in the ninth to the eleventh embodiments, the laser light source devices 2 are aligned in a one-dimensional direction (X-axis direction), a plurality of them may be arranged in a two-dimensional direction (XY direction).

Twelfth Embodiment

A twelfth embodiment will be explained while referring to FIG. 22.

Figure 22:
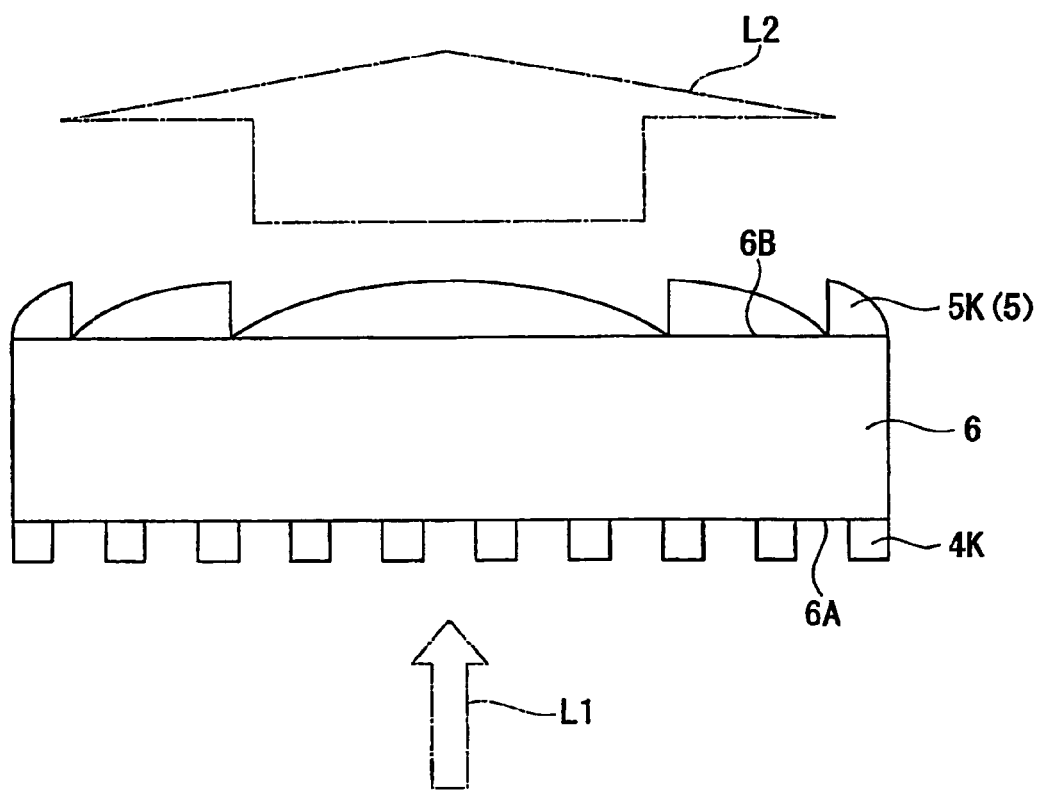
FIG. 22 is a schematic diagram of an illumination device according to a twelfth embodiment.

FIG. 22 is a diagram of an illumination device 1 according to an eleventh embodiment.

This embodiment is characterized in that a diffractive optical element 5K functioning as the angle adjusting optical element 5 is provided between the diffractive optical elements 4K and the first face 11.

In FIG. 22, the illumination device 1 includes a diffractive optical element 4K on which laser light L1 from a laser light source device 2 is illuminated, and a second diffractive optical element 5K on which the light from the diffractive optical element 4K is illuminated, and also adjusts the emission angle of the light it emits.

As the embodiments described above, the diffractive optical element 4K can set an illumination region to a rectangular shape.

Therefore, the diffractive optical element 4K illuminates a rectangular illumination region of the second diffractive optical element 5K.

The second diffractive optical element 5K can adjust the emission angle of light which is emits, consequently adjusting the incidence angle of light which is incident on the first face 11.

The second diffractive optical element 5K of this embodiment contains a Fresnel lens.

In this embodiment, the illumination device 1 includes a light-transmitting substrate 6. The diffractive optical element 4K is provided on a face of the substrate 6 which is near the laser light source devices 2, and the second diffractive optical element 5K is provided on a face of the substrate 6 which is near the first face 11.

The substrate 6 is configured from, for example, a film-like member of transparent synthetic resin or a plate-like member of a glass such as quartz.

Thus, the angle adjusting optical element 5 can be configured using the diffractive optical element 5K.

The diffractive optical element 4K which sets the shape of the illumination region on a first substrate face 6A of the transparent substrate 6 which can transmit light, can be provided. The second diffractive optical element 5K which adjusts the emission angle of the light on a second substrate face 6B of the substrate 6, can be provided. Thereby, it is possible to reduce the number of components of the illumination device 1 and efficiently illuminate the first face 11.

In the twelfth embodiment, instead of providing the substrate 6, the diffractive optical element 4K and the second diffractive optical element 5K may be separated from each other.

In the twelfth embodiment, the diffractive optical element 4K may be provided on the first substrate face 6A of the substrate 6, and a refractive lens or the like which functions as an angle adjusting optical element may be provided on the second substrate face 6B of the substrate 6.

The angle adjusting optical element 5 may include a combination of the refractive lens described in the eleventh embodiment and the diffractive optical element described in the twelfth embodiment.

While in the eighth to the twelfth embodiments, phase modulation type diffractive optical elements are used as the transmission type diffractive optical elements forming the diffractive optical elements, amplitude modulation type diffractive optical elements can be used instead.

The transmission type diffractive optical elements are not limitative of the invention, and reflection type diffractive optical elements can be used instead.

It is also acceptable, for example, to combine transmission type diffractive optical elements with reflection type diffractive optical elements.

By optimizing the surface conditions of these diffractive optical elements, they can be given desired functions.

While in each of the above embodiments, a transmission type liquid crystal device (light valve) is used as the spatial light modulation device, a reflection type liquid crystal device can also be used, and a reflection type light modulation device (mirror modulator) such as a digital micro-mirror device (DMD) may also be used.

While each of the above embodiments describes an example of a frontal projection type projector which emits light containing image information on the screen 100 from the front face side of the screen 100.

The illumination device 1 of the above embodiments can also be applied in a so-called rear projector including a projection unit U, a screen 100, and a casing. In this rear projector, the projection unit U is arranged on a rear face side of the screen 100, and light containing image information is emitted on the screen 100 from its rear face side.

Incidentally, while the projector PJ of the embodiments described above includes the first, second, and third illumination devices 1R, 1G, and 1B which each include the laser light source devices 2 capable of emitting lights of basic colors (R, G, and B)

It is acceptable if the configuration includes one illumination device having a red laser light source device for emitting red light (R), a green laser light source device for emitting green light (G), and a blue laser light source device for emitting blue light (B) are arranged in an array.

In this case, the laser light emission operations of the laser light source devices capable of emitting lights of basic colors are performed in time slots, and the operation of the light valve is controlled in synchrony with the laser light emission operation of the laser light source device, thereby it is possible to display a full-color image on the screen 100 by using one illumination device and one light valve.

Thirteenth Embodiment

While in the above embodiments, the illumination device 1 illuminates the spatial light modulation device, and light transmitted through the spatial light modulation device displays an image on the screen 100. In the image display device (projector), a spatial light modulation device may be omitted.

Figure 23:
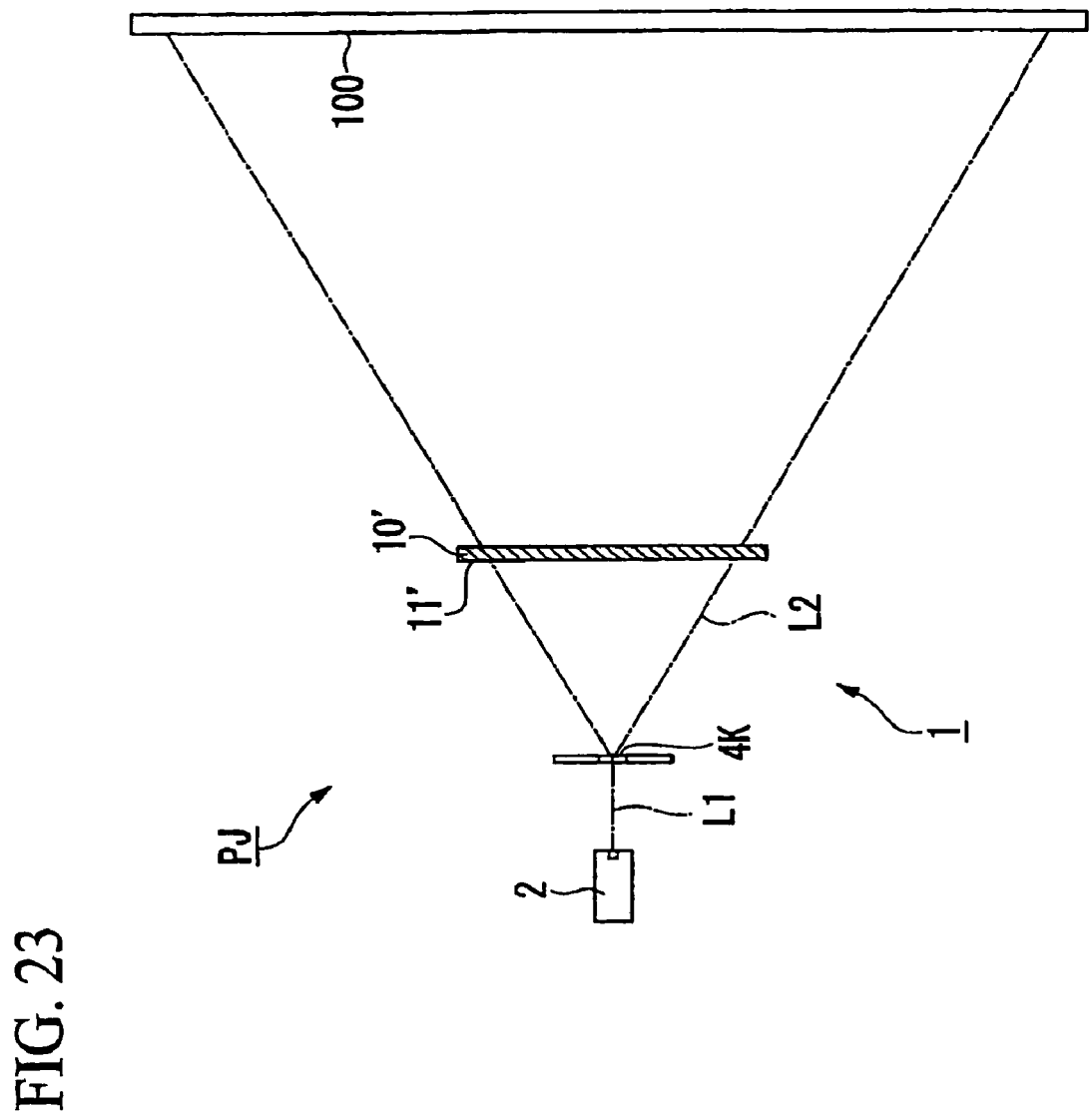
FIG. 23 is a schematic diagram of an image display device according to a thirteenth embodiment.

As shown in the example in FIG. 23, the illumination device 1 of the above embodiments can be applied in a so-called slide projector, which uses an illumination device 1 to illuminate a face 11' of a slide (positive film) 10' containing image information, and projects light containing the image information on a screen 100.

A direct-view type image display device, which does not include a projection system and allows an image from a spatial light modulation device to be observed directly, may be used as the image display device.

Fourteenth Embodiment

A fourteenth embodiment will be explained.

In the following explanation of this embodiment, explanation of configurations identical to those in the embodiments already described will be omitted.

Figure 24:
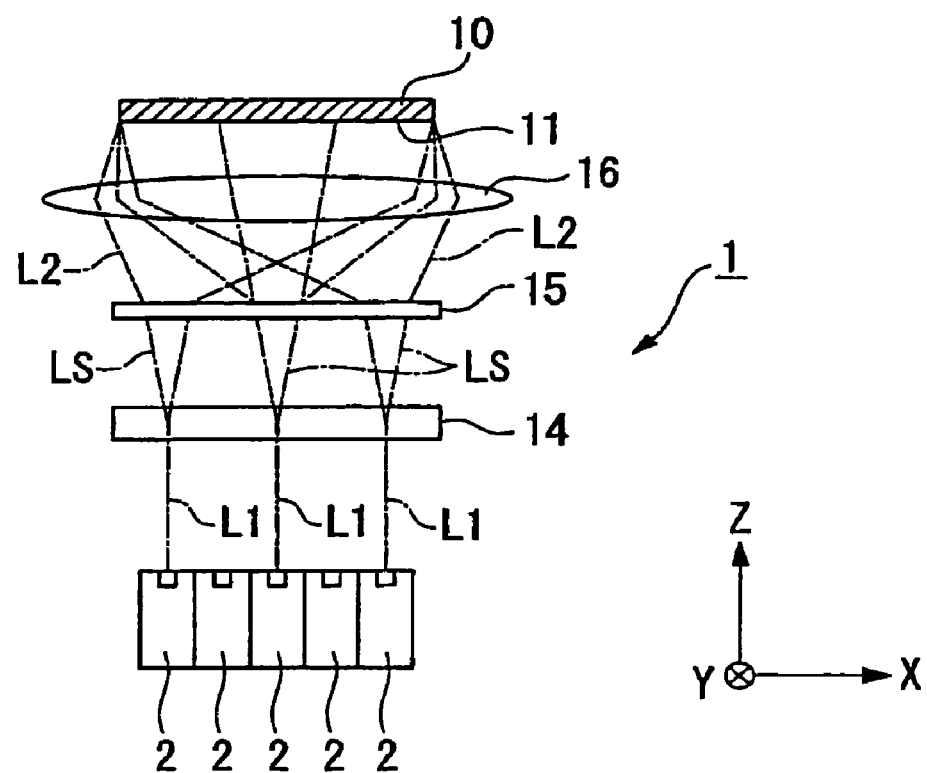
FIG. 24 is a schematic diagram of an illumination device according to a fourteenth embodiment.

FIG. 24 is a schematic diagram of an illumination device according to the fourteenth embodiment.

In FIG. 24, an illumination device 1 illuminates a first face 11 of a predetermined member 10. The illumination device 1 includes a plurality of laser light source devices 2 emitting laser lights L1, a diffusive optical element 14 on which the laser lights L1 emitted from the laser light source devices 2 are incident, and which generates diffused lights LS by diffusing the incident laser lights L1, and a diffractive optical element 15 which generates diffracted light L2 from the diffused lights LS and uses the diffracted lights L2 to illuminate the first face 11.

An angle adjusting optical element 16 is provided between the diffractive optical element 15 and the first face 11. The angle adjusting optical element 16 is illuminated by light from the diffractive optical element 15, and adjusts the emission angle of the light. The diffractive optical element 15 illuminates the first face 11 with the diffracted lights L2 via the angle adjusting optical element 16.

The plurality of laser light source devices 2 are arranged in an array.

In the example shown in FIG. 24, the plurality of laser light source devices 2 are aligned in a one-dimensional direction (X-axis direction).

Light-emitting faces of the laser light source devices 2 face the +Z side, and the laser light source devices 2 emit light toward the +Z direction.

The diffusive optical element 14 generates the diffused lights LS by diffusing the laser lights L1 from the laser light source devices 2.

In this embodiment, the diffusive optical element 14 contains a scattering member which scatters the illuminated light.

Figure 25:
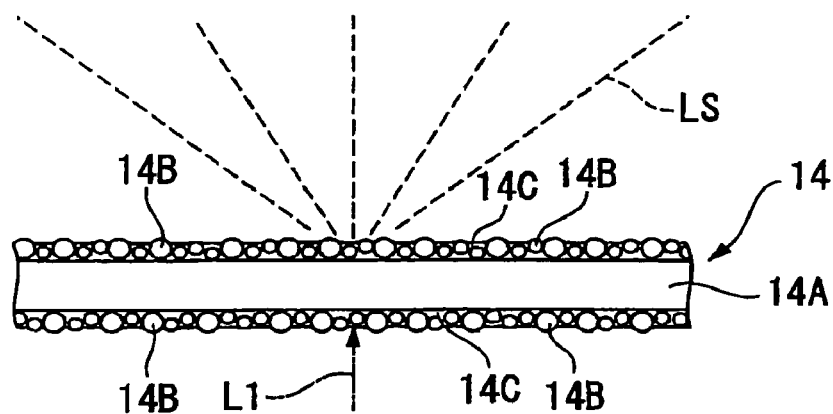
FIG. 25 is a schematic diagram of an example of a diffusive optical element.

FIG. 25 is an example of a scattering member (diffusive optical element) 14.

The scattering member 14 includes a light-transmitting base material 14A, and microparticles 14B on the base material 14A.

The light-transmitting base material 14A is formed from, for example, a film-like member of transparent synthetic resin or a plate-like member of a glass such as quartz.

A plurality of the microparticles 14B of different refractive indexes are affixed on the base material 14A via binders 14C.

Light which is incident on the scattering member 14 passes through it, and is thereby converted to diffused light (scattered light) L2.

Figure 26:
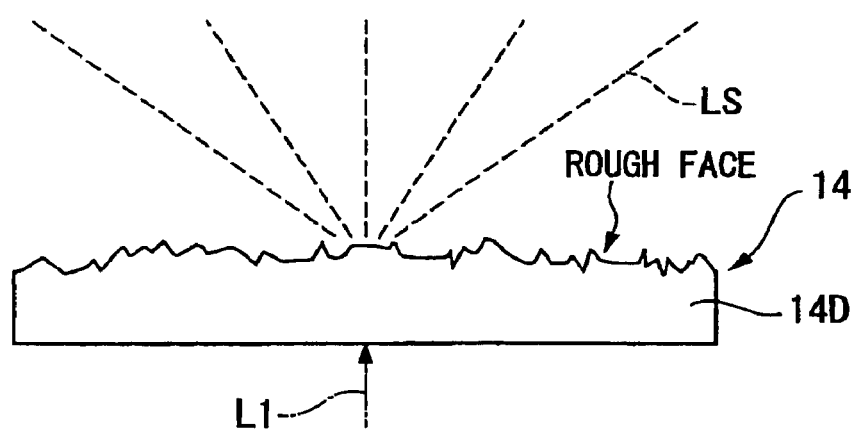
FIG. 26 is a schematic diagram of an example of a diffusive optical element.

FIG. 26 is another example of a scattering member (diffusive optical element) 14.

The scattering member 14 includes an optical member 14D having a rough face.

The optical element 14D includes, for example, a plate-like member of a glass which can transmit light, such as quartz.

Light incident on the scattering member 14 passes through it, and is thereby converted to diffused light (scattered light) L2.

Returning to FIG. 24, the diffractive optical element 15 generates diffracted lights L2 using the diffused lights LS from the diffusive optical element 14, and uses the diffracted lights L2 to illuminate the first face 11 via the angle adjusting optical element 16.

In this embodiment, the diffractive optical element 15 illuminates a predetermined illumination region of the first face 11 with the diffracted light L2.

The diffracted light L2 generated by the diffractive optical element 15 is diffused such as to illuminate a predetermined region, and the diffractive optical element 15 illuminates the predetermined illumination region with the diffracted light L2 and uniformizes the illumination in the illumination region.

The diffractive optical element 15 can illuminate a predetermined face (the first face 11) over an illumination region which is larger than the emission region of the light-emitting face of the diffractive optical element 15 from which the light is emitted.

Thus, the diffractive optical element 15 is a so-called enlargement system (enlargement illumination system).

In this embodiment, the diffractive optical element 15 illuminates a rectangular illumination region on the first face 11.

As mentioned in the above embodiments, the surface of the diffractive optical element 15 includes a plurality of rectangular reentrant portions 15M (uneven structure).

The diffractive optical element 15 is optimized such that the diffractive optical element 15 illuminates the first face 11 with primary light.

Returning to FIG. 24, the angle adjusting optical element 16 is provided between the diffractive optical element 15 and the first face 11.

The angle adjusting optical element 16 is illuminated by the diffracted light (primary light) L2 from the diffractive optical element 15, and includes an angle adjustment function of adjusting the emission angle of the emitting light.

The angle adjusting optical element 16 includes a refractive lens (field lens).

The refractive lens includes, for example, a spherical face lens, or an axis objective lens which has rotational symmetry with regard to the optical axis of a non-spherical face lens or the like.

Alternatively, the angle adjusting optical element 16 may include a Fresnel lens or the like.

The angle adjusting optical element 16 can adjust the emission angle of light illuminated from the diffractive optical element 15, thereby adjusting the incidence angle of the light with respect to the first face 11.

In this embodiment, the angle adjusting optical element 16 is optimized to enable adjustment of the emission angle of its emitted light, such that the diffracted lights (primary lights) L2, which are generated by the diffractive optical element 15 based on the plurality of laser lights L1 emitted from the plurality of laser light source devices 2, overlappingly illuminate a predetermined region on the first face 11.

Figure 27:
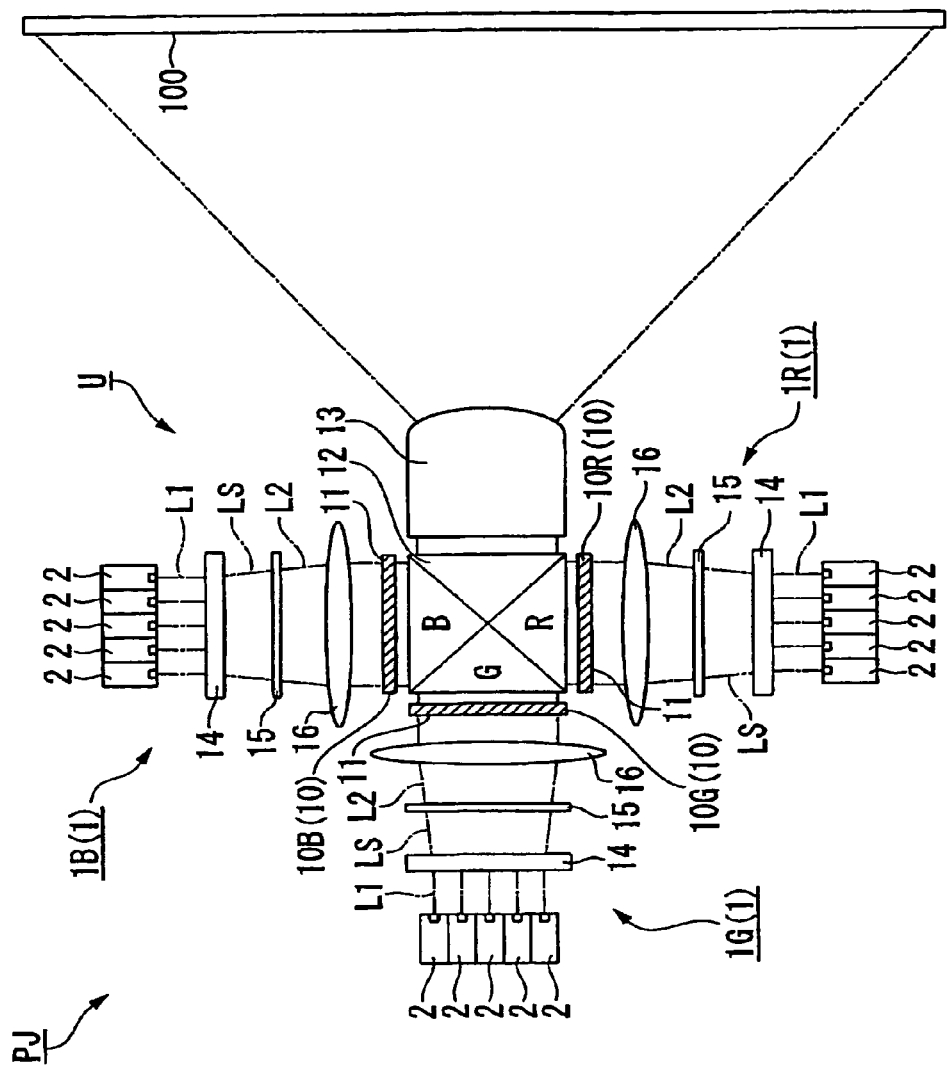
FIG. 27 is a schematic diagram of an image display device including an illumination device according to the fourteen embodiment.

FIG. 27 is a schematic diagram of an image display device including the illumination device 1 (1R, 1G, and 1B) according to this embodiment.

As an example of an image display device, this embodiment describes a projection type image display device (projector) which projects colored light containing image information generated by a spatial light modulation device via a projection system on a screen.

In FIG. 27, a projection type image display device PJ includes a projection unit U which projects the light containing image information on a screen 100 (second face).

By projecting the light from the projection unit U on the screen 100, an image is formed on the screen 100.

The projection type image display device PJ of this embodiment uses a transmission type screen 100, and projects the light containing image information on the screen 100 from a front face side thereof.

The projection unit U includes a first illumination device 1R which can illuminate a first face with light of a first basic color (red light), a second illumination device 1G which can illuminate the first face with light of a second basic color (green light), a third illumination device 1B which can illuminate the first face with light of a third basic color light (blue light), a first spatial light modulation device 10R which has an incidence face (first face) 11 illuminated by the first illumination device 1R, and modulates illuminated light in accordance with image information, a second spatial light modulation device 10G which has an incidence face (first face) 11 illuminated by the second illumination device 1G, and modulates illuminated light in accordance with image information, a third spatial light modulation device 10B which has an incidence face (first face) 11 illuminated by the third illumination device 1B, and modulates illuminated light in accordance with image information, a color synthesis system 12 which synthesizes the basic color lighted lights modulated by the spatial light modulation devices 10R, 10G, and 10B, and a projection system 13 which projects the light generated by the color synthesis system 12 on the screen 100.

Each of the spatial light modulation devices 10R, 10G, and 10B contains a liquid crystal device.

For convenience in the following explanation, "spatial light modulation device" is termed "light valve".

A light valve includes an incidence side polarization plate, a panel including a liquid crystal sealed between a pair of glass substrates, and an emission side polarizing plate.

Pixel electrodes and orientation films are provided on the glass substrates.

The light valves constituting the spatial light modulation devices allow transmission only of light in predetermined oscillation directions, and lights of basic colors which are incident on the light valves are modulated as they pass through them.

The laser light source devices 2 of the first illumination device 1R emit red (R) laser light.

The first illumination device 1R uses the diffractive optical element 4K to generate, from the red laser light, diffracted light which illuminates a desired region, and illuminates the incidence face 11 of the first light valve 10R with this generated diffracted light via the optical element 5.

The laser light source devices 2 of the second illumination device 1G emit green (G) laser light.

The second illumination device 1G uses the diffractive optical element 4K to generate, from the green laser light, diffracted light which illuminates a desired region, and illuminates the incidence face 11 of the second light valve 10G with this generated diffracted light via the optical element 5.

The laser light source devices 2 of the third illumination device 1B emit blue (B) laser light.

The third illumination device 1B uses the diffractive optical element 4K to generate, from the blue laser light, diffracted light which illuminates a desired region, and illuminates the incidence face 11 of the third light valve 10B with this generated diffracted light via the optical element 5.

The lights of basic colors which are modulated by passing through the light valves 10R, 10G, and 10B (modulated lights) are synthesized by the color synthesis system 12.

The color synthesis system 12 includes a dichroic prism, the red light (R), the green light (G), and the blue light (B) being synthesized by the color synthesis system 12 into full-color synthesized light.

The full-color synthesized light emitted from the color synthesis system 12 is supplied to the projection system 13.

The projection system 13 projects the full-color synthesized light on the screen 100.

The projection system 13 is a so-called enlargement system which enlarges the image on the incidence side and projects it on the screen 100.

The projection unit U uses the projection system 13 to project the full-color synthesized light, which contains image information transmitted via the light valves 10R, 10G, and 10B respectively illuminated by the illumination devices 1R, 1G, and 1B, on the screen 100, and thereby forms a full-color image on the screen 100.

An observer views the image emitted on the screen 100 via the projection unit U.

As described above according to this embodiment, since the diffractive optical element 15 generates the diffracted light L2 from the diffused light LS from the diffusive optical element 14 and illuminates the first face 11 with this diffracted light L2, even if the diffractive optical element 15 emits zero-order light, a local increase in the illumination (luminance) of this zero-order light on the first face 11 can be suppressed.

In this embodiment, the diffractive optical element 15 is set using a predetermined method such as the abovementioned repetitive Fourier method such that zero-order light is not emitted and such that the generated primary light can illuminate the first face 11 with uniform illumination distribution.

There is concern that the diffractive optical element 15 will emit zero-order light due to manufacturing errors (process errors) at the time of its manufacture, wavelength errors or the like of the laser light L1 emitted from the laser light source devices 2.

Error (blurring) in the wavelength of the laser light L1 emitted from the laser light source devices 2 may be caused by changes in temperature etc.

Zero-order light is often formed on the extension line of the laser light L1 which is incident on the diffractive optical element 15, and the intensity of the zero-order light is often a value which corresponds to the intensity (illumination) of the light incident on the diffractive optical element 15.

In such a case, when the laser light L1 from the laser light source devices 2 is directly incident on the diffractive optical element 15, zero-order light sometimes illuminates a region of the first face 11 on the extension line of the laser light L1 which is incident on the diffractive optical element 15, and the illumination (luminance) of the section which is illuminated by the zero-order light locally increases.

In this case, the image formed based on the spatial light modulation device 10 is inferior.

In this embodiment, since the diffused light LS generated by the diffusive optical element 14 is incident on the diffractive optical element 15, the light incident on the diffractive optical element 15 is diffused (scattered).

Therefore, a local increase in the illumination (luminance) of the light incident on the diffractive optical element 15 can be suppressed.

Figure 28:
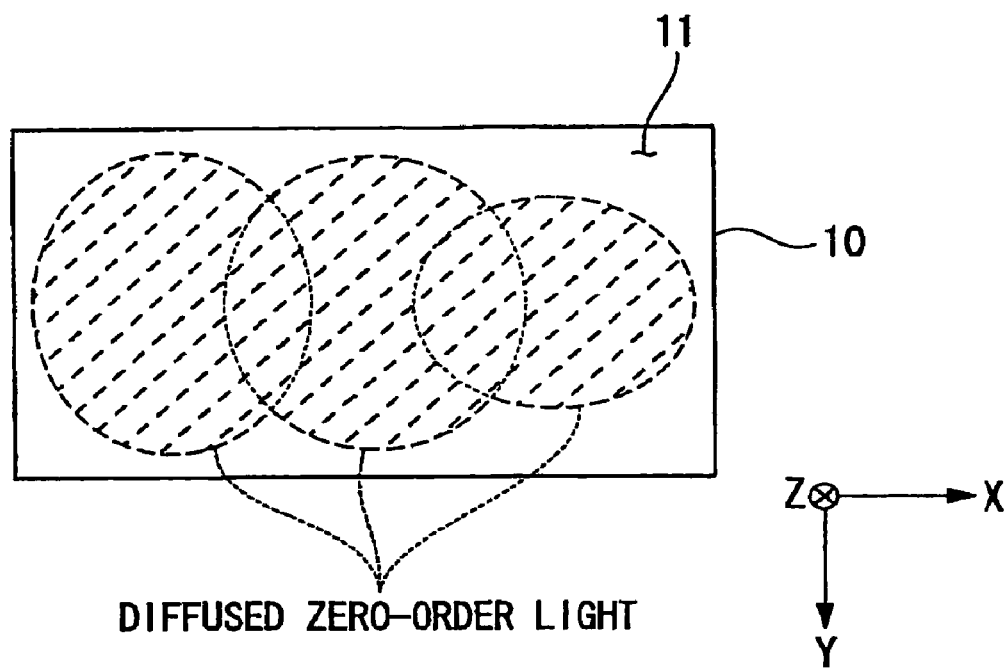
FIG. 28 is a diagram for explanation of effects of an illumination device according to the fourteenth embodiment.

Therefore, even if the diffractive optical element 15 emits zero-order light, since the intensity of this zero-order light is reduced, a local increase in the illumination (luminance) of the zero-order light emitted from the diffractive optical element 15 can be suppressed as shown schematically diagram of FIG. 28. In the illumination device 1, it is possible to illuminate the first face 11 in an approximately desired state.

Therefore, the image display device PJ which includes the illumination device 1 can form a desired image using light via the first (incidence) face 11.

According to the illumination device 1 of this embodiment, increase in the size and complexity of the device, or increase in its cost, can be suppressed, and the first face 11 can be illuminated efficiently with uniform illumination distribution.

Thus, when an optical system such as a rod integrator and a fly-eye lens is used to illuminate the first face 11 with uniform illumination distribution using laser light emitted from the laser light source devices, the number of components and complexity of the optical system are liable to increase, there is concern that the size and complexity of the overall device may also increase.

There is also concern that increasing the number of components and using expensive components such as a rod integrator will increase the cost of the device.

Moreover, there is concern that Fresnel reflection loss and the like generated from the interfaces between the optical elements, and of a reduction in the light utilization efficiency and the like are occurred.

In this embodiment, since comparatively inexpensive optical elements are used and the number of components is suppressed, it is possible to suppress increases in the size and complexity of the device, or increase in the device cost, and efficiently illuminate the first face 11.

Furthermore, since the diffractive optical element 15 can set the illumination region LA on the first face 11, the illumination region LA can be efficiently illuminated.

Thus, when the first face 11 is illuminated by light via a lens or the like, there is concern that the shape of the illumination region LA may differ from the shape of the first face 11.

For example, while the first face 11 is rectangular, illumination via the lens may obtain a circular illumination region LA.

In this case, in order to illuminate the first face 11 while suppressing leakage of light, the circular illumination region LA must be enlarged, and shaped using a light-intercepting member and the like. This reduces the light utilization efficiency.

In this embodiment, by using the diffractive optical element 15 to set the illumination region LA, almost all of the light generated by the diffractive optical element 15 can be illuminated onto the first face 11, and it is possible to increase the light utilization efficiency.

Furthermore, since a laser light source device is used as the light source, polarized light can be emitted, and, in comparison with a configuration using a white-light source such as an ultrahigh frequency mercury lamp as the light source, components such a polarization dividing element (polarization beam splitter) and a color dividing element (dichroic mirror) can be omitted.

Since laser light (basic color light) of a narrow wavelength band is emitted, superior color reproduction can be obtained when displaying an image using this laser light.

Furthermore, since ultraviolet light is not irradiated to the liquid crystal devices (light valves), deterioration of the light valves can be suppressed.

Furthermore in this embodiment, since the illumination device 1 includes a plurality of the laser light source devices 2, the amount of light (illumination) on the first face 11 can be increased.

By displaying an image using light via the first face 11 illuminated by the illumination device 1, the precision and contrast of the image can be increased.

In this embodiment, since the illumination device 1 includes the plurality of laser light source devices 2, generation of a speckled pattern can be suppressed.

A high-contrast speckled pattern is formed in space when a rough face or a scattering face including uneven media is illuminated by coherent light, such as laser light, and scattered light is observed.

The scattered lights generated at each point on the scattering face interfere in a mutually random positional relationship, resulting in a complex interference pattern and leading to a possibility that the first face 11 will be illuminated with non-uniform illumination distribution.

In this embodiment, since the illumination device 1 includes a plurality of the laser light source devices 2 which emit mutually incoherent laser lights, the first face 11 is illuminated by lights having mutually different illumination distributions (luminance distributions).

Therefore, when diffracted lights based on these laser lights are made to overlap on the first face 11, the speckled pattern is visibly reduced, achieving a substantially uniform illumination distribution on the incidence face 11.

Therefore, the image display device PJ can display an image with few luminance irregularities (illumination irregularities).

By providing the angle adjusting optical element 16, the incidence angle of light against the first face 11 can be reduced and the first face 11 can be illuminated efficiently.

Furthermore, the diffracted lights L2 generated by the diffractive optical element 15 based on the laser lights L1 emitted from the plurality of laser light source devices 2 can be overlappingly illuminated onto a predetermined region of the first face 11.

Thus, it is possible to efficiently illuminate the incidence face 11 with high illumination.

Furthermore, generation of speckled patterns can be suppressed, and the first face 11 can be illuminated with substantially uniform illumination distribution.

As described above while referring to FIGS. 6A to 6D, since the diffractive optical element 15 can be manufactured using a nanoimprint method, it is possible to easily manufacture in large quantities, and their manufacturing cost can be reduced.

Fifteenth Embodiment

A fifteenth embodiment will be explained while referring to FIGS. 29A and 29B.

This embodiment is characterized in that a lens is used as the diffusive optical element 14.

In the following explanation, constituent parts which are identical or similar to those of the preceding embodiment are designated with identical reference numerals, and explanation thereof is simplified or omitted.

Figure 29A:
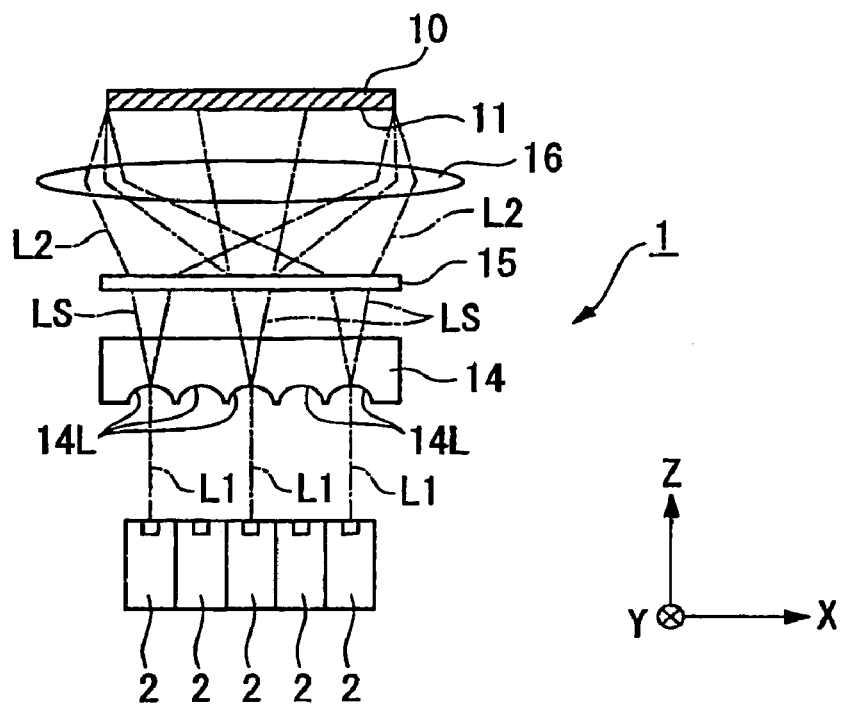
FIGS. 29A and 29B are diagrams for explanation of an illumination device according to a fifteenth embodiment.

FIG. 29A is a diagram of an illumination device 1 according to the fifteenth embodiment.

In FIG. 29A, the illumination device 1 includes a plurality of laser light source devices 2. The laser light source devices 2 are arranged in an array.

The illumination device 1 includes a diffusive optical element 14 having lens faces 14L on which laser lights L1 from the plurality of laser light sources 2 are incident and which generate diffused lights LS by diffusing the incident laser lights L1, and a diffractive optical element 15 which generates diffracted lights L2 using the diffused lights LS from the diffusive optical element 14, and illuminates the first face 11 with the diffracted lights L2.

Light from the diffractive optical element 15 is incident on an angle adjusting optical element 16, which is provided between the diffractive optical element 15 and the first face 11, and which adjusts the emission angle of light it emits. The diffractive optical element 15 illuminates the first face 11 using the generated diffracted lights L2 via the angle adjusting optical element 16.

The lens faces 14L are provided on a face of the diffusive optical element 14 near the laser light source devices 2. The lens faces 14L are arranged in correspondence with the laser light source devices 2.

The diffusive optical element 14 including the lens faces 14L can transmit light, and the lens faces 14L generate diffused lights LS by diffusing the laser lights L1 which are incident on them.

Thereby, the generated diffused lights LS are transmitted through the diffusive optical element 14, emitted from the face near the diffractive optical element 15, and converted to diffracted lights L2 by the diffractive optical element 15.

Thus, the diffusive optical element 14 can be configured from a lens system.

Figure 29B:
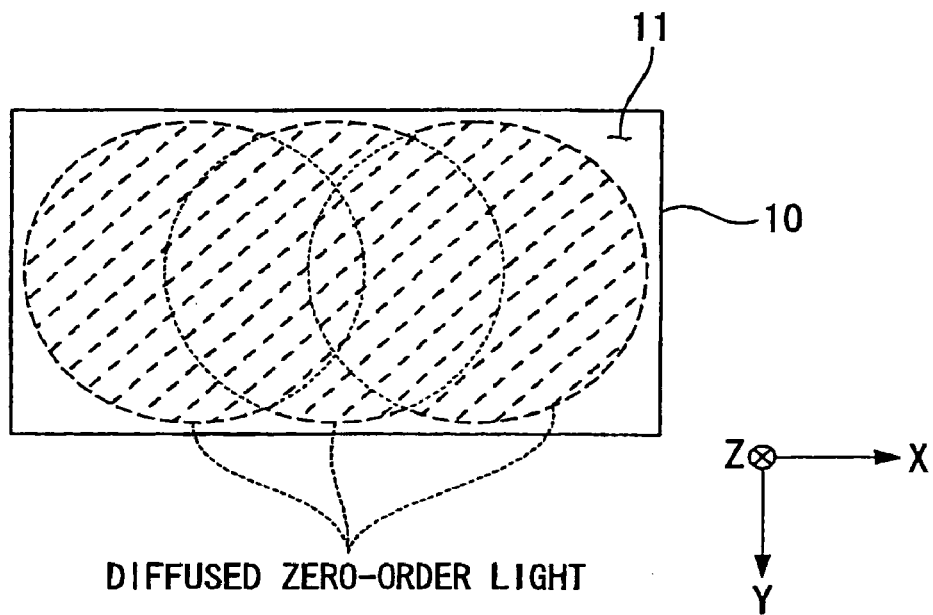

By making the diffused lights LS generated by the diffusive optical element 14 incident on the diffractive optical element 15, even if the diffractive optical element 15 emits zero-order light, as shown schematically in FIG. 29B, a local increase in the illumination (luminance) of the zero-order light on the first face 11 can be suppressed.

Sixteenth Embodiment

This embodiment is characterized in that the generated diffused lights LS are collimated.

Figure 30A:
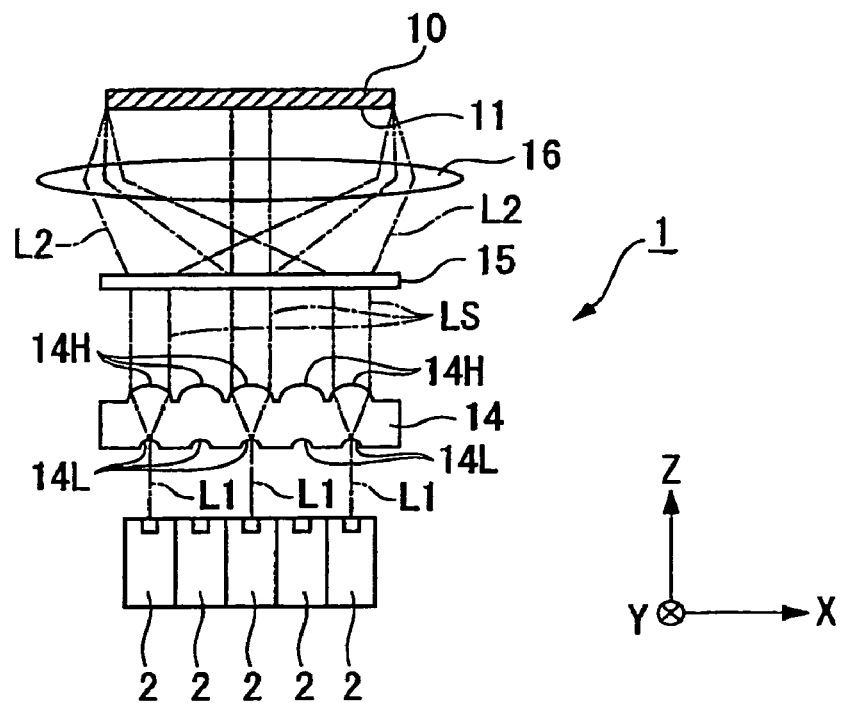
FIGS. 30A and 30B are diagrams for explanation of an illumination device according to a sixteenth embodiment.

FIG. 30A is a diagram of an illumination device 1 according to a sixteenth embodiment.

In FIG. 30A, the illumination device 1 includes a plurality of laser light source devices 2 arranged in an array, a diffusive optical element 14 which generates diffused lights LS by diffusing laser lights L1, and a diffractive optical element 15 which generates diffracted lights L2 using the diffused lights LS from the diffusive optical element 14, and illuminates a first face 11 using the diffracted lights L2.

Light from the diffractive optical element 15 illuminates an angle adjusting optical element 16, which is provided between the diffractive optical element 15 and the first face 11, and which adjusts the emission angle of emitted light. The diffractive optical element 15 illuminates the first face 11 using the generated diffracted lights L2 via the angle adjusting optical element 16.

The diffusive optical element 14 includes first lens faces 14L on which laser lights L1 from the plurality of laser light sources 2 are incident, and which generate diffused lights LS by diffusing the incident laser lights L1, and second lens faces (collimating faces) 14H which collimate the diffused lights LS generated by the lens faces 14L.

The lens faces 14L are provided near a face of the diffusive optical element 14 on a side near the laser light source devices 2.

The collimating faces 14H are provided on a face of the diffusive optical element 14 on a side near the diffractive optical element 15.

The lens faces 14L of the diffusive optical element 14 are arranged in correspondence with the laser light source devices 2, and the collimating faces 14H are arranged in correspondence with the lens faces 14L.

The lens faces 14L generate diffused lights LS by diffusing the incident laser lights L1.

The diffusive optical element 14 can transmit light, the diffused lights LS generated by the lens faces 14L are collimated by the collimating faces 14H, after the diffused lights LS transmitted through the diffusive optical element 14.

The diffused lights LS emitted from the face containing the collimating faces 14H are converted to diffracted lights L2 by the diffractive optical element 15.

Thus, in this embodiment, since the diffused lights LS generated by the lens face 14L are collimated by the collimating faces 14H, the incidence angle of light on the diffractive optical element 15 can be reduced such that, for example, the incidence face of the diffractive optical element 15 can be illuminated at a perpendicular by the diffused lights LS.

Thus, it is possible to make the diffractive optical element 15 easier to design, and suppress any decrease in its refractive efficiency.

Figure 30B:
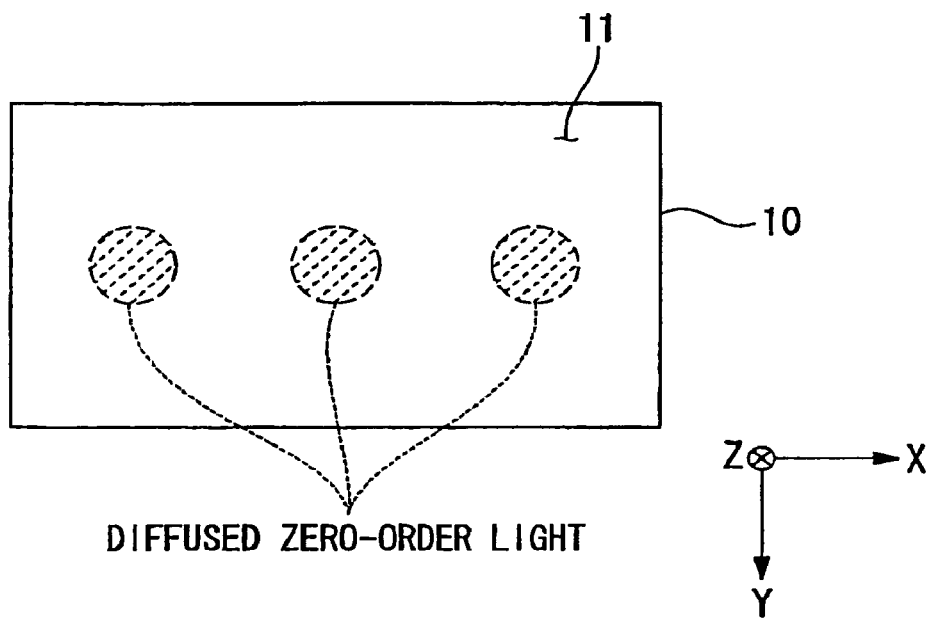

Since the diffusive optical element 14 generates the diffused lights LS from the light which is incident on the diffractive optical element 15, even if the diffractive optical element 15 emits zero-order light, as shown schematically in FIG. 30B, a local increase in the illumination (luminance) of this zero-order light on the first face 11 can be suppressed.

Seventeenth Embodiment

A seventeenth embodiment will be explained.

This embodiment is characterized in that a diffractive optical element 4K is uses as the diffusive optical element 14.

Figure 31A:
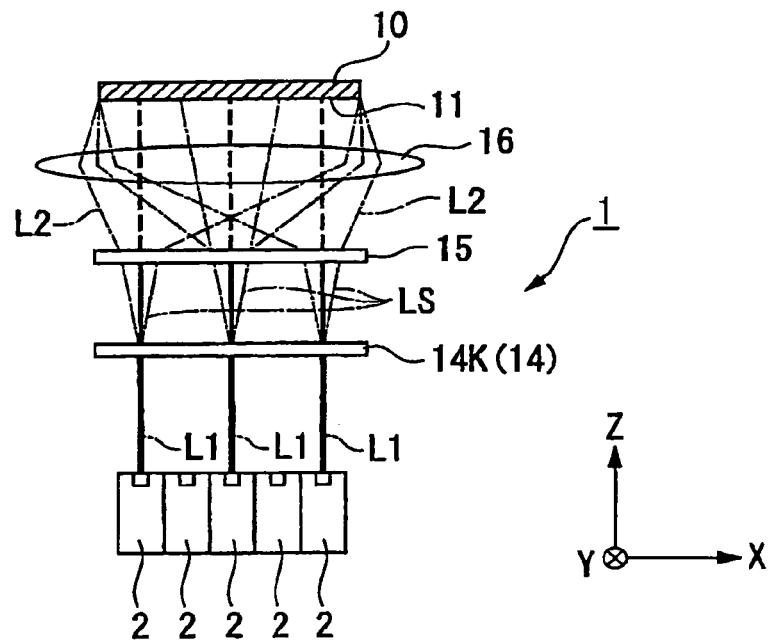
FIGS. 31A and 31B are diagrams for explanation of an illumination device according to a seventeen embodiment.

FIG. 31A is a diagram of an illumination device 1 according to the seventeenth embodiment.

In FIG. 31A, the illumination device 1 includes a plurality of laser light source devices 2 arranged in an array, a diffractive optical element for diffusion (diffusive optical element) 14K which generates diffused lights LS by diffusing laser lights L1, and a diffractive optical element 15 which generates diffracted lights L2 using the diffused lights LS from the diffractive optical element for diffusion 14K, and illuminates a first face 11 using the diffracted lights L2.

Light from the diffractive optical element 15 illuminates an angle adjusting optical element 16, which is provided between the diffractive optical element 15 and the first face 11, and which adjusts the emission angle of emitted light. The diffractive optical element 15 illuminates the first face 11 using the generated diffracted lights L2 via the angle adjusting optical element 16.

The diffractive optical element for diffusion 14K is illuminated by the laser lights L1 emitted from the laser light source devices 2, and generates diffused lights LS by diffusing the incident laser lights L1.

Thus, the diffractive optical element for diffusion 14K has a diffused light generating function.

By using a predetermined method such as the abovementioned repetitive Fourier method to optimize the surface conditions of the diffractive optical element 14K, it is possible to form the diffractive optical element 14K having a diffused light generation function.

In this embodiment, the diffractive optical element 14K generates the diffused light LS such that the maximum value of the intensity (illumination) of zero-order light of the emitted diffused light LS is less than 5% of the intensity (illumination) of the incident laser light L1.

As the embodiments described above, the diffractive optical element 15 includes an illumination region setting function, and can set the illumination region on the first face 11 to a rectangular shape using the generated diffracted light L2.

Thus, as a diffusive optical element 14, the diffractive optical element 14K can be used.

Figure 31B:
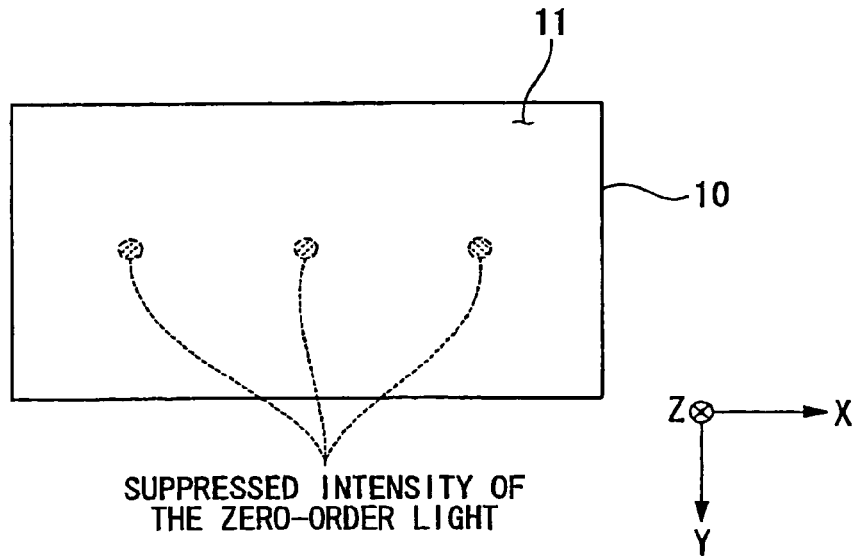

By making the diffused light LS incident on the diffractive optical element 15, even if the diffractive optical element 15 emits zero-order light, as shown schematically in FIG. 31B, a local increase in the illumination (luminance) of the zero-order light on the first face 11 can be suppressed.

In this embodiment, even if the diffractive optical element 15 emits zero-order light, provided that the diffractive optical element 15 is constructed such that the maximum value of the intensity (illumination) of the zero-order light of the emitted diffused light LS is less than 5% of the intensity (illumination) of the incident laser light L1, the intensity (illumination) of the zero-order light of the diffracted light L2 can be reduced to less than 0.25% of the intensity (illumination) of the incident laser light L1.

Furthermore, as described with reference to FIGS. 6A to 6D, since the diffractive optical element for diffusion 14K can be manufactured by a nanoimprint method, it is possible to easily manufacture in large quantities, and manufacturing costs can be reduced.

Eighteenth Embodiment

An eighteenth embodiment will be explained.

This embodiment is characterized in that the diffusive optical element 14 is provided on a first substrate face 7A of a light-transmitting substrate 7, and the diffractive optical element 15 is provided on a second substrate face 7B of the substrate 7.

Figure 32A:
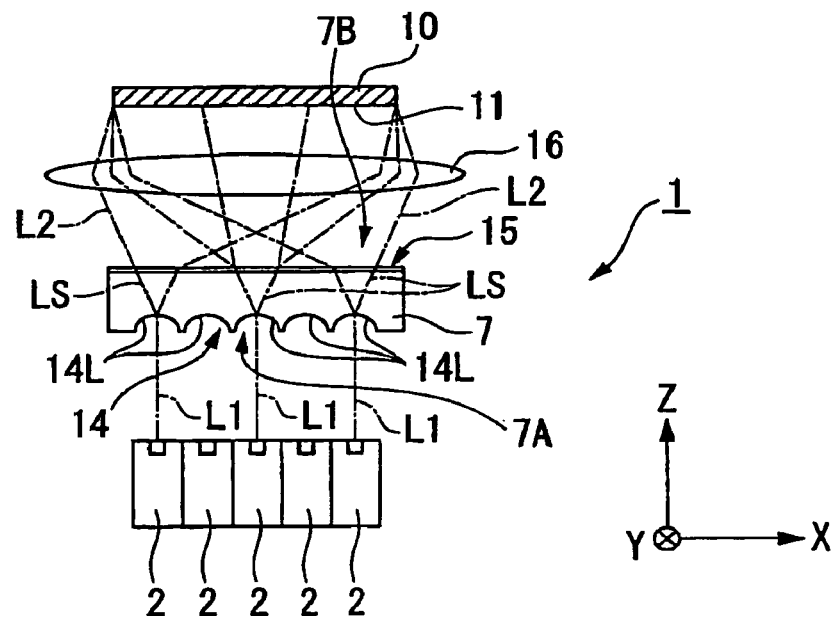
FIGS. 32A and 32B are diagrams for explanation of an illumination device according to an eighteenth embodiment.

FIG. 32A is a diagram of an illumination device 1 according to an eighteenth embodiment.

In FIG. 32A, the illumination device 1 includes the laser light source devices 2 arranged in an array, a diffusive optical element 14 which generates diffused lights LS by diffusing laser lights L1, and a diffractive optical element 15 which generates diffracted lights L2 using the diffused lights LS from the diffusive optical element 14 and illuminates a first face 11 using the diffracted lights L2.

Light from the diffractive optical element 15 illuminates an angle adjusting optical element 16, which is provided between the diffractive optical element 15 and the first face 11, and which adjusts the emission angle of emitted light. The diffractive optical element 15 illuminates the first face 11 using the generated diffracted lights L2 via the angle adjusting optical element 16.

In this embodiment, the illumination device 1 includes the light-transmitting substrate 7. The diffusive optical element 14 is provided on a first substrate face 7A of the substrate 7 near the laser light source devices 2, and the diffractive optical element 15 is provided on the second substrate face 7B of the substrate 7 near the first face 11 (angle adjusting optical element 16).

The substrate 7 is configured from, for example, a film-like member of transparent synthetic resin or a plate-like member of a glass such as quartz.

In this embodiment, the diffusive optical element 14 is configured from lens faces 14L provided on the first substrate face 7A of the substrate 7.

A plurality of the lens face 14L are arranged in correspondence with the plurality of laser light source devices 2, and generate diffused light LS by diffusing the incident laser lights L1.

The substrate 7 can transmit light, and the diffused light LS is converted to diffracted lights L2 by the diffractive optical element 15, after the diffused light LS generated by the lens face 14L transmitted through the substrate 7.

Furthermore, in this embodiment, the diffractive optical element 15 includes reentrant portions (15M) provided in the second substrate face 7B of the substrate 7.

Thus, the diffusive optical element 14 can be provided in the first substrate face 7A of the light-transmitting substrate 7, and the diffractive optical element 15 can be provided in the second substrate face 7B of the substrate 7, thereby the number of components of the illumination device 1 can be reduced and the first face 11 can be illuminated efficiently.

Figure 32B:
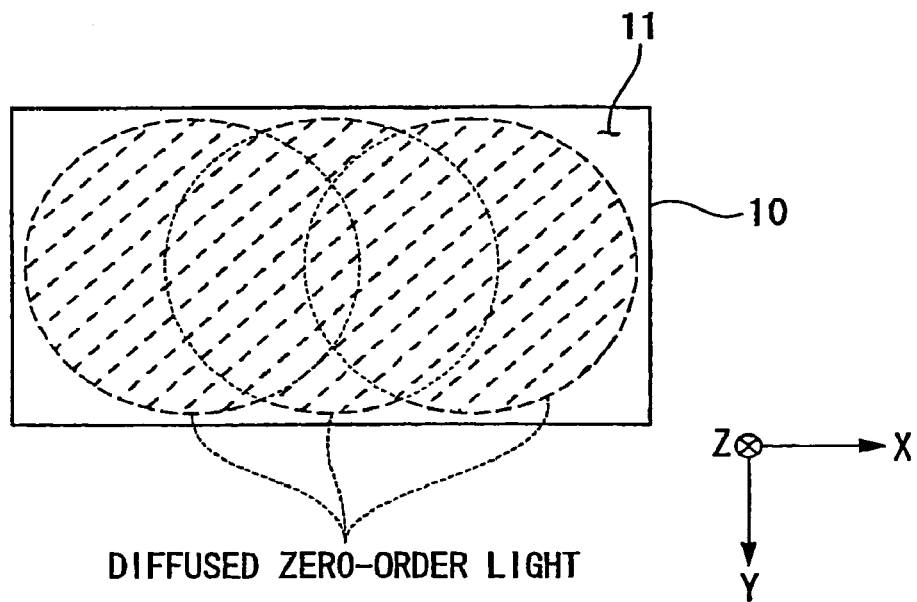

Since the light which is incident on the diffractive optical element 15 is diffused by the diffusive optical element 14 to generate the diffused light L2, even if the diffractive optical element 15 emits zero-order light, as shown schematically in FIG. 32B, a local increase in the illumination (luminance) of the zero-order light on the first face 11 can be suppressed.

While in each of the fourteenth to the eighteenth embodiments describes an example of a frontal projection type projector which emits light containing image information on the screen 100 from the front face side of the screen 100.

The illumination device 1 of the above embodiments can also be applied in a so-called rear projector including a projection unit U, a screen 100, and a casing. In this rear projector, the projection unit U is arranged on a rear face side of the screen 100, and light containing image information is emitted on the screen 100 from its rear face side.

While in each of the above embodiments, a transmission type liquid crystal device (light valve) is used as the spatial light modulation device, a reflection type liquid crystal device can also be used, and a reflection type light modulation device (mirror modulator) such as a digital micro-mirror device (DMD) may also be used.

Incidentally, while the projector PJ of the embodiments described above includes the first, second, and third illumination devices 1R, 1G, and 1B which each include the laser light source devices 2 capable of emitting lights of basic colors (R, G, and B).

It is acceptable if the configuration includes one illumination device having a red laser light source device for emitting red light (R), a green laser light source device for emitting green light (G), and a blue laser light source device for emitting blue light (B) are arranged in an array.

In this case, the laser light emission operations of the laser light source devices capable of emitting lights of basic colors are performed in time slots, and the operation of the light valve is controlled in synchrony with the laser light emission operation of the laser light source device, thereby it is possible to display a full-color image on the screen 100 by using one illumination device and one light valve.

Nineteenth Embodiment

While in each of the embodiments described above, the illumination device 1 illuminates the spatial light modulation device, and light transmitted through the spatial light modulation device displays an image on the screen 100. In the image display device (projector), a spatial light modulation device may be omitted.

Figure 33:
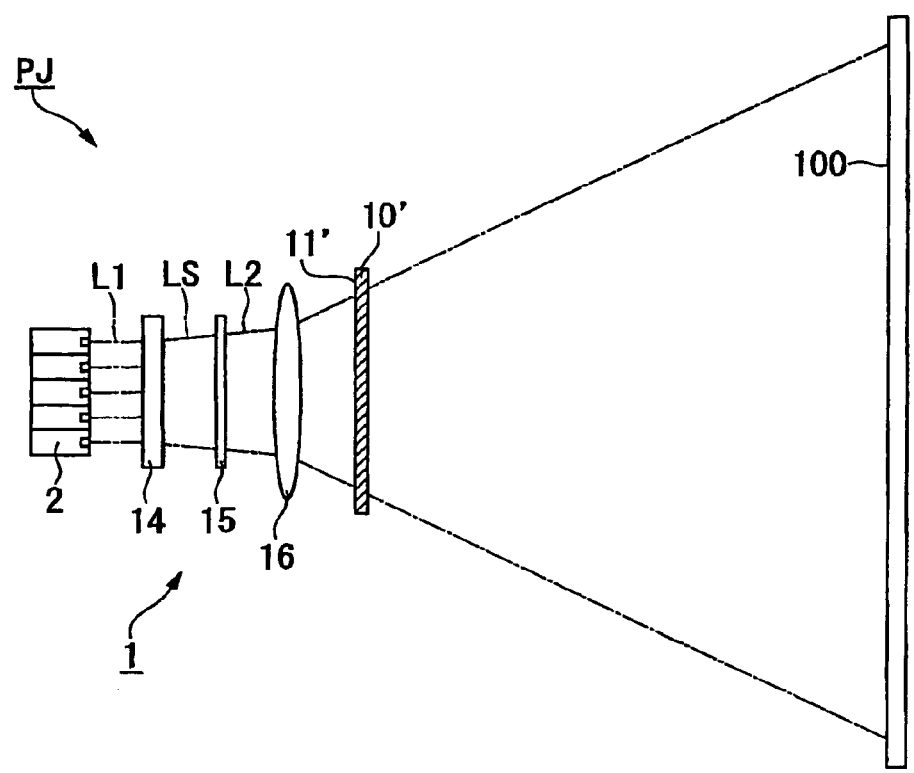
FIG. 33 is a schematic diagram of an image display device according to a nineteenth embodiment.

As shown in the example of FIG. 33, the illumination device 1 of the above embodiments can be applied in a so-called slide projector, which uses an illumination device 1 to illuminate a face 11' of a slide (positive film) 10' containing image information and projects light containing the image information on a screen 100.

A direct-view type image display device, which does not include a projection system and allows an image from a spatial light modulation device to be observed directly, may be used as the image display device.

While in the fourteenth to the nineteenth embodiments described above, the illumination device 1 includes the plurality of laser light source devices 2 aligned in a one-dimensional direction (X-axis direction), they may be arranged in an array in a two-dimensional direction (XY direction).

While in the embodiments described above, the illumination device 1 includes a plurality of laser light source devices 2, just one laser light source device 2 may be included.

While in the embodiments described above, the illumination device 1 includes the angle adjusting optical element 16, the angle adjusting optical element 16 may be omitted.

In this case, the diffractive optical element 15 directly illuminates the first face 11 with the generated diffracted lights L2.

While in the embodiments described above, phase modulation type diffractive optical elements are used as the transmission type diffractive optical elements (diffractive gratings) forming the diffractive optical elements, amplitude modulation type diffractive optical elements can be used instead.

The transmission type diffractive optical elements are not limitative of the invention, and reflection type diffractive optical elements can also be used.

It is also acceptable, for example, to combine transmission type diffractive optical elements with reflection type diffractive optical elements.

By optimizing the surface conditions of the diffractive optical elements, they can be given desired functions.

What is claimed is:

1. An image display device comprising:
   a spatial light modulation device having a first face and modulating light illuminated on the first face in accordance with an image signal;
   a laser light source device emitting laser light; and
   a diffractive optical element on which the laser light emitted from the laser light source device is incident, generating diffracted light from the incident laser light, and illuminating the first face of the spatial light modulation device with the diffracted light, wherein
   the first face of the spatial light modulation device is provided at a position on which zero-order light emitted from the diffractive optical element is not incident, and an image is displayed by light via the first face.

2. The image display device according to claim 1, wherein the first face is provided at a position separated from an extension line of the incident laser light which is incident on the diffractive optical element.

3. The image display device according to claim 1, wherein the diffractive optical element illuminates the first face with primary light.

4. The image display device according to claim 1, further comprising:
   a plurality of the laser light source devices, each of which having a light-emitting face; and
   the first face having a predetermined side,
   wherein the light-emitting faces are aligned along the predetermined side in plan view.

5. The image display device according to claim 4, wherein the first face includes a first side and a second side which is longer than the first side, and the light-emitting faces are aligned along the second side in plan view.

6. The image display device according to claim 4, wherein the first face includes two mutually opposing sides, and light-emitting faces are aligned along each of the two sides in plan view.

7. The image display device according to claim 4, wherein the first face includes at least two pairs of mutually opposing sides, and light-emitting faces are aligned along each of the sides in plan view.

8. The image display device according to claim 1, wherein the diffractive optical element emits the zero-order light in a direction which is different to the incidence direction of the laser light incident on the diffractive optical element, and the first face is provided on an extension line of the laser light which is incident upon the diffractive optical element.

9. The image display device according to claim 1, wherein:
   the spatial light modulation device has an incidence face, and
   the first face includes the incidence face of the spatial light modulation device.

10. A projector comprising:
    the image display device according to claim 1; and
    a projection system projecting light containing image information via the first face on a second face.

11. An illumination device comprising:
    a first face including a predetermined illumination region;
    a laser light source device emitting laser light; and
    a diffractive optical element, on which the laser light emitted from the laser light source device is incident, including a plurality of reentrant portions which are two-dimensionally formed on a surface of the diffractive optical element and in which depths of the reentrant portions that are adjacent in a longitudinal direction and in a lateral direction are mutually different, generating diffracted light from the incident laser light, illuminating on the predetermined illumination region of the first face with the diffracted light, and providing uniform illumination in the illumination region.

12. The illumination device according to claim 11, wherein the diffractive optical element illuminates on a rectangular illumination region of the first face.

13. The illumination device according to claim 11, wherein the laser light emitted from the laser light source device is made directly incident on the diffractive optical element.

14. The illumination device according to claim 11, further comprising:
    a plurality of the laser light source devices; and
    a plurality of the diffractive optical elements, wherein
    each of the diffractive optical elements is arranged in correspondence with each of the laser light source devices.

15. An image display device comprising:
    a first face illuminated by the illumination device according to claim 11, wherein the image display device displays an image by light via the first face.

16. A projector comprising:
    the image display device according to claim 15; and
    a projection system projecting light containing image information via the first face on a second face.

* * * * *